United States Patent
Kim et al.

(10) Patent No.: US 12,483,644 B2
(45) Date of Patent: Nov. 25, 2025

(54) ELECTRONIC DEVICE INCLUDING ACTUATOR FOR REMOVING TRAY

(71) Applicant: SAMSUNG ELECTRONICS CO., LTD., Suwon-si (KR)

(72) Inventors: Garim Kim, Suwon-si (KR); Sungkwang Kim, Suwon-si (KR); Hun Kim, Suwon-si (KR); Jiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 308 days.

(21) Appl. No.: 18/229,005

(22) Filed: Aug. 1, 2023

(65) Prior Publication Data

US 2024/0040022 A1    Feb. 1, 2024

Related U.S. Application Data

(63) Continuation of application No. PCT/KR2023/009053, filed on Jun. 28, 2023.

(30) Foreign Application Priority Data

Jul. 28, 2022 (KR) .................. 10-2022-0094021
Sep. 8, 2022 (KR) .................. 10-2022-0114568

(51) Int. Cl.
*H04M 1/02* (2006.01)
*H04B 1/3818* (2015.01)

(52) U.S. Cl.
CPC .................. *H04M 1/026* (2013.01)

(58) Field of Classification Search
CPC ...... H04M 1/02; H04M 1/0202; H04M 1/026; H04M 1/0274; H04B 1/38; H04B 1/3816; H04B 1/3818
See application file for complete search history.

(56) References Cited

U.S. PATENT DOCUMENTS 8,553,419 B2   10/2013  Luo et al.
8,651,884 B1   2/2014   Rivera
(Continued)

FOREIGN PATENT DOCUMENTS

CN   104953400 A   9/2015
CN   106877033 A   6/2017
(Continued)

OTHER PUBLICATIONS

Communication dated Sep. 18, 2023, issued by International Search Authority in corresponding International Application No. PCT/KR2023/009053.

*Primary Examiner* — Quochien B Vuong
(74) *Attorney, Agent, or Firm* — Sughrue Mion, PLLC

(57) ABSTRACT

An electronic device includes: a housing including an opening and sockets; a tray to be insertable into the sockets or removable from the sockets through the opening; and an actuator to generate power to remove the tray from the sockets. The tray includes: a tray body including a space for inserting an external component into the sockets in a longitudinal direction; a tray head provided at one end of the tray body in the longitudinal direction; and a protrusion provided at another end of the tray body in the longitudinal direction and including an inclined surface provided on one side of the protrusion. When the tray is inserted into the sockets, the actuator presses the inclined surface in a width direction of the tray and removes the tray from the sockets in the longitudinal direction of the tray.

20 Claims, 15 Drawing Sheets

(56) References Cited

U.S. PATENT DOCUMENTS

| | | | |
|---|---|---|---|
| 9,013,888 B2 | 4/2015 | Trzaskos et al. | |
| 9,445,520 B2 * | 9/2016 | Shukla | H04B 1/3816 |
| 9,628,593 B2 * | 4/2017 | Yang | H04M 1/026 |
| 9,998,164 B2 * | 6/2018 | Wu | H04B 1/3818 |
| 2004/0092146 A1 | 5/2004 | Tien | |
| 2020/0060031 A1 * | 2/2020 | Zeng | H04M 1/026 |

FOREIGN PATENT DOCUMENTS

| | | |
|---|---|---|
| CN | 111262059 A | 6/2020 |
| KR | 10-2014-0114792 A | 9/2014 |
| KR | 10-1641104 B1 | 7/2016 |
| KR | 10-2019-0125767 A | 11/2019 |
| KR | 10-2020-0110749 A | 9/2020 |

* cited by examiner

ELECTRONIC DEVICE INCLUDING ACTUATOR FOR REMOVING TRAY

CROSS-REFERENCE TO RELATED APPLICATIONS

This application is a continuation application of International Application No. PCT/KR2023/009053 designating the United States, filed on Jun. 28, 2023, in the Korean Intellectual Property Receiving Office and claiming priority to Korean Patent Application No. 10-2022-0094021, filed on Jul. 28, 2022, and Korean Patent Application No. 10-2022-0114568, filed on Sep. 8, 2022, in the Korean Intellectual Property Office, the disclosures of which are incorporated by reference herein in their entireties.

BACKGROUND

1. Field

The disclosure relates to an electronic device including an actuator for removing a tray and a method thereof.

2. Description of Related Art

An electronic device may accommodate a selectively detachable external component, for example, a card-type external component, an external memory card, a subscriber identification module card, and a user identity module card. A user may combine or separate the electronic device and the selectively detachable external component, as necessary.

SUMMARY

According to one aspect of the disclosure, an electronic device includes: a housing including an opening and sockets aligned with the opening; a tray configured to be insertable into the sockets or removable from the sockets through the opening; and an actuator configured to generate power to remove the tray from the sockets. The tray includes: a tray body including a space for inserting an external component into the sockets in a longitudinal direction; a tray head provided at one end of the tray body in the longitudinal direction; and a protrusion provided at another end of the tray body in the longitudinal direction and including a first inclined surface provided on one side of the protrusion. In a state in which the tray is inserted into the sockets, the actuator is configured to press the first inclined surface in a width direction of the tray and is configured to remove the tray from the sockets in the longitudinal direction of the tray.

According to another aspect of the disclosure, an electronic device includes: a housing including an opening and a socket aligned with the opening; a tray configured to be insertable into the socket or removable from the socket through the opening; intermediate structures provided adjacent to an end of the tray in a state in which the tray is inserted into the socket; and an actuator configured to generating power to remove the tray from the socket. In the state in which the tray is inserted into the socket, the actuator is configured to press the intermediate structures in a width direction of the tray and to remove the tray from the socket.

According to another aspect of the disclosure, an electronic device includes: a housing includes an opening and sockets aligned with the opening; a tray configured to insertable into the sockets or removable from the sockets through the opening; and an actuator configured to generate power to remove the tray from the sockets. The tray includes: a tray body includes a space for inserting an external component into the sockets in a longitudinal direction; a tray head provided at one end of the tray body in the longitudinal direction; and a protrusion provided at another end of the tray body in the longitudinal direction, the protrusion includes a first inclined surface formed on one side of the protrusion. The actuator comprises: a power source configured to generate power in a linear direction parallel to a width direction of the tray; a rod connected to the power source, the rod being parallel to the width direction of the tray; and a block connected to an end of the rod and includes a second inclined surface corresponding to the first inclined surface, and in a state in which the tray is inserted into the sockets, the actuator is provided in a space between another end of the tray body in the longitudinal direction and the sockets, and in a state in which the tray is inserted into the sockets, the actuator is configured to press the first inclined surface in a width direction of the tray and is configured to remove the tray from the sockets in the longitudinal direction of the tray, and the first inclined surface is configured to be inclined at an angle of 30 degrees to 60 degrees with respect to the width direction of the tray.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
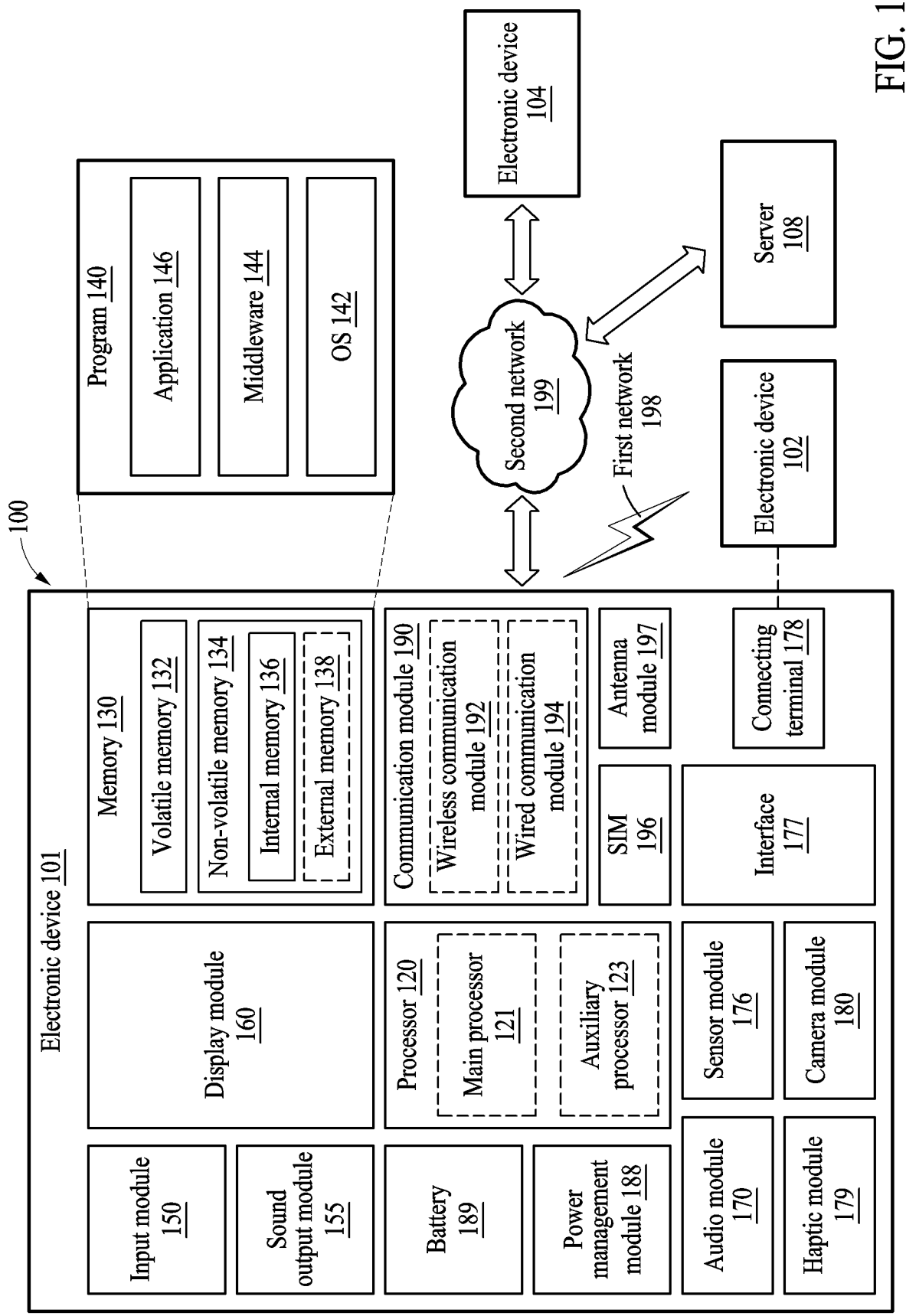
FIG. 1 is a block diagram illustrating an electronic device in a network environment according to an embodiment.

Hereinafter, embodiments will be described in detail with reference to the accompanying drawings. When describing the embodiments with reference to the accompanying drawings, like reference numerals refer to like components and a repeated description related thereto will be omitted.

FIG. 1 is a block diagram illustrating an electronic device 101 in a network environment 100 according to an embodiment. Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the above components may be omitted from the electronic device 101, or one or more other components may be added in the electronic device 101. In an embodiment, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123.

According to an embodiment, the auxiliary processor 123 (e.g., an NPU) may include a hardware structure specified for artificial intelligence (AI) model processing. An AI model may be generated by machine learning. Such learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning algorithms. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via their tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, for example, new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, for example, a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form an mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 may need to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer a result of the performing to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra-low-latency services using, e.g., distributed computing or MEC. In an embodiment, the external electronic device (e.g., the electronic device 104) may include an Internet-of-things (IoT) device. The server 108 may use machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to an embodiment may be one of various types of electronic devices. The electronic device may include, for example, a portable communication device (e.g., a smart phone), a computer device, a portable multimedia device, a portable medical device, a camera, a wearable device, or a home appliance device. According to an embodiment of the disclosure, the electronic device is not limited to those described above.

An embodiment of the disclosure and the terms used therein may not be intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "$1^{st}$", "$2^{nd}$", or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least portion of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2A:
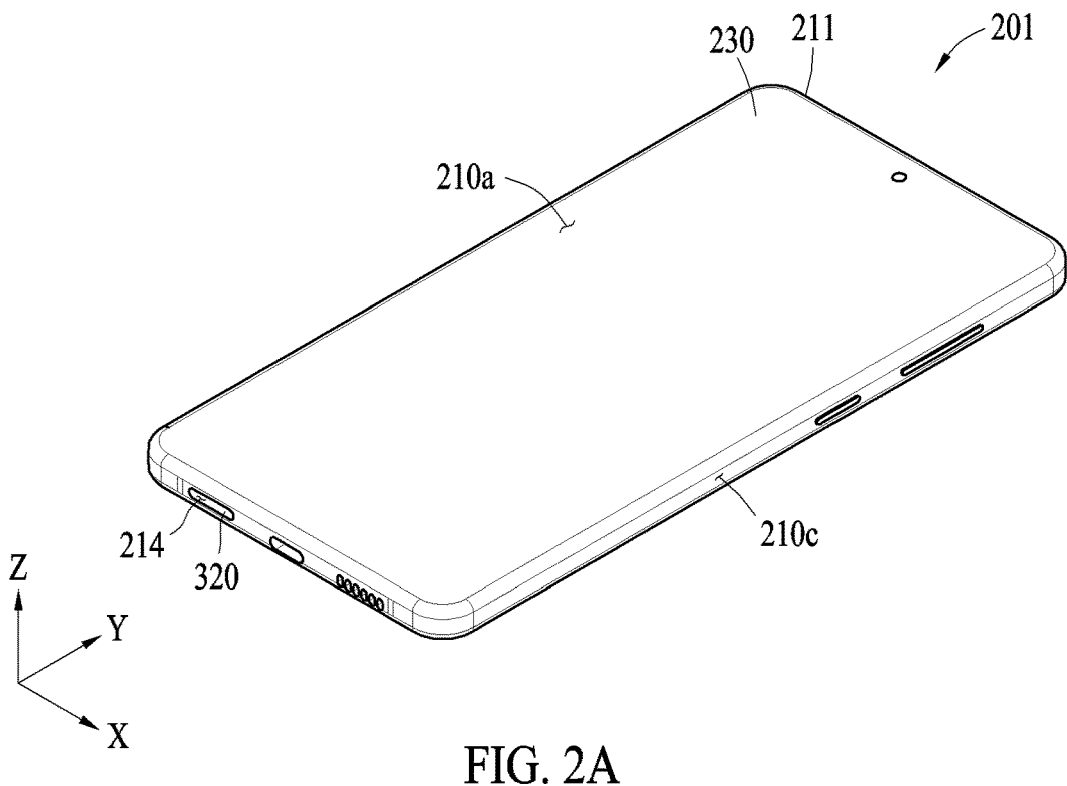
FIG. 2A is a front perspective view of an electronic device according to an embodiment.
Figure 2B:
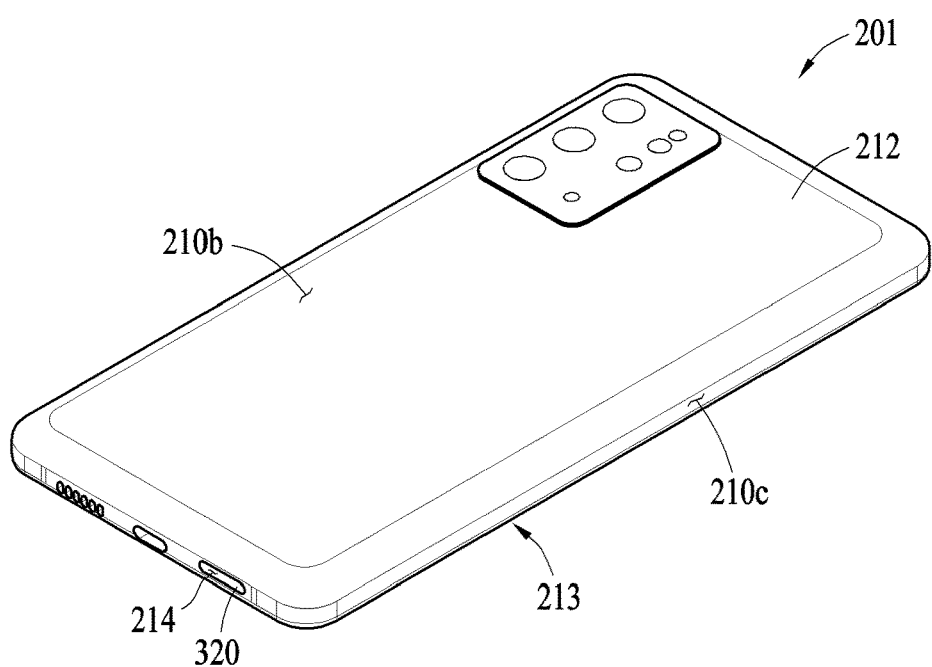
FIG. 2B is a rear perspective view of an electronic device according to an embodiment.
Figure 2C:
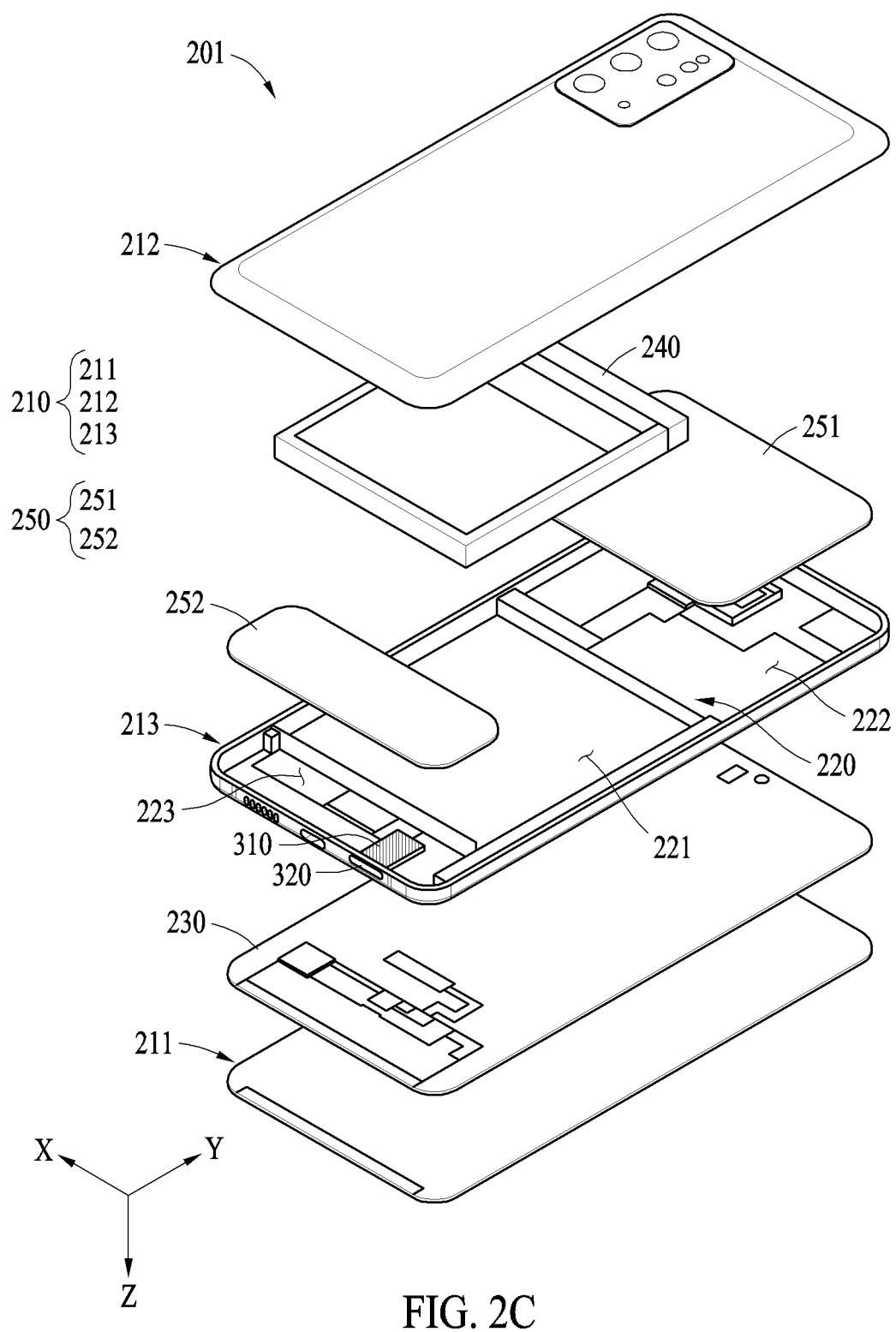
FIG. 2C is an exploded perspective view of an electronic device according to an embodiment.

FIG. 2A is a front perspective view of an electronic device according to an embodiment. FIG. 2B is a rear perspective view of an electronic device according to an embodiment. FIG. 2C is an exploded perspective view of an electronic device according to an embodiment.

Figure 3A:
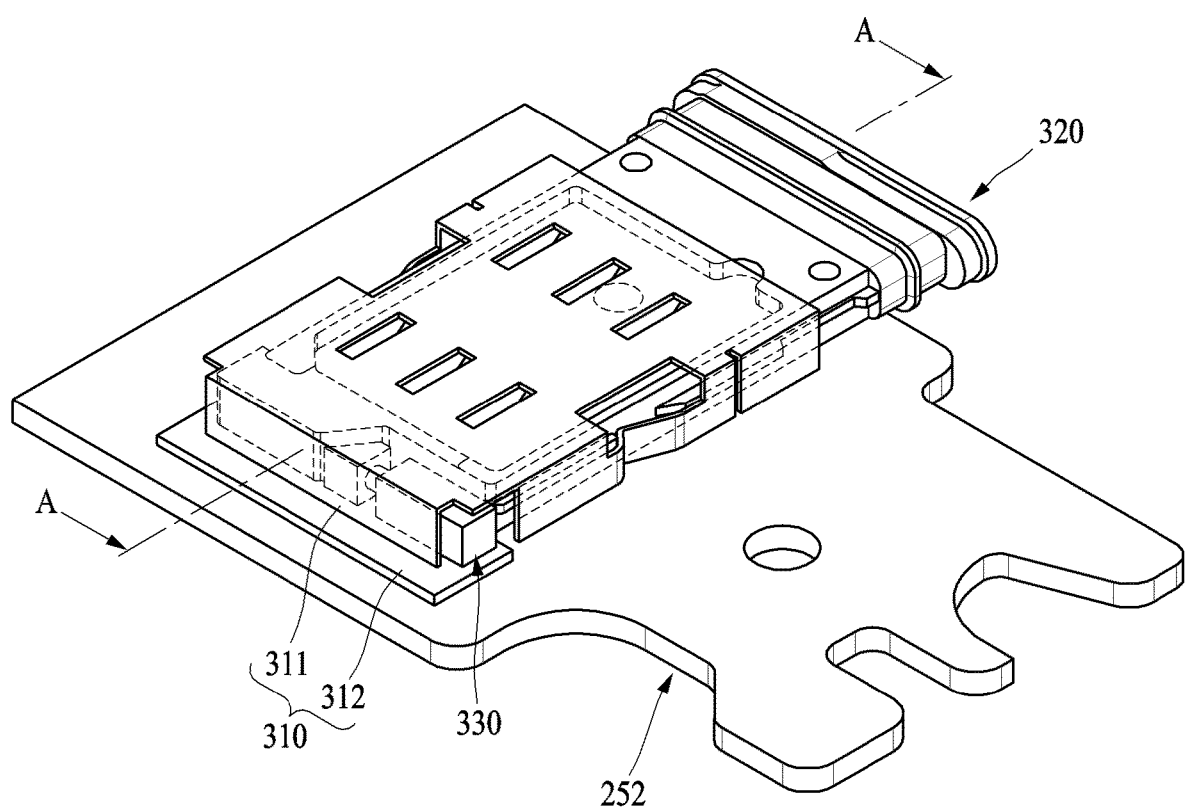
FIG. 3A is a perspective view illustrating a state in which a tray is inserted into a socket according to an embodiment.
Figure 3B:
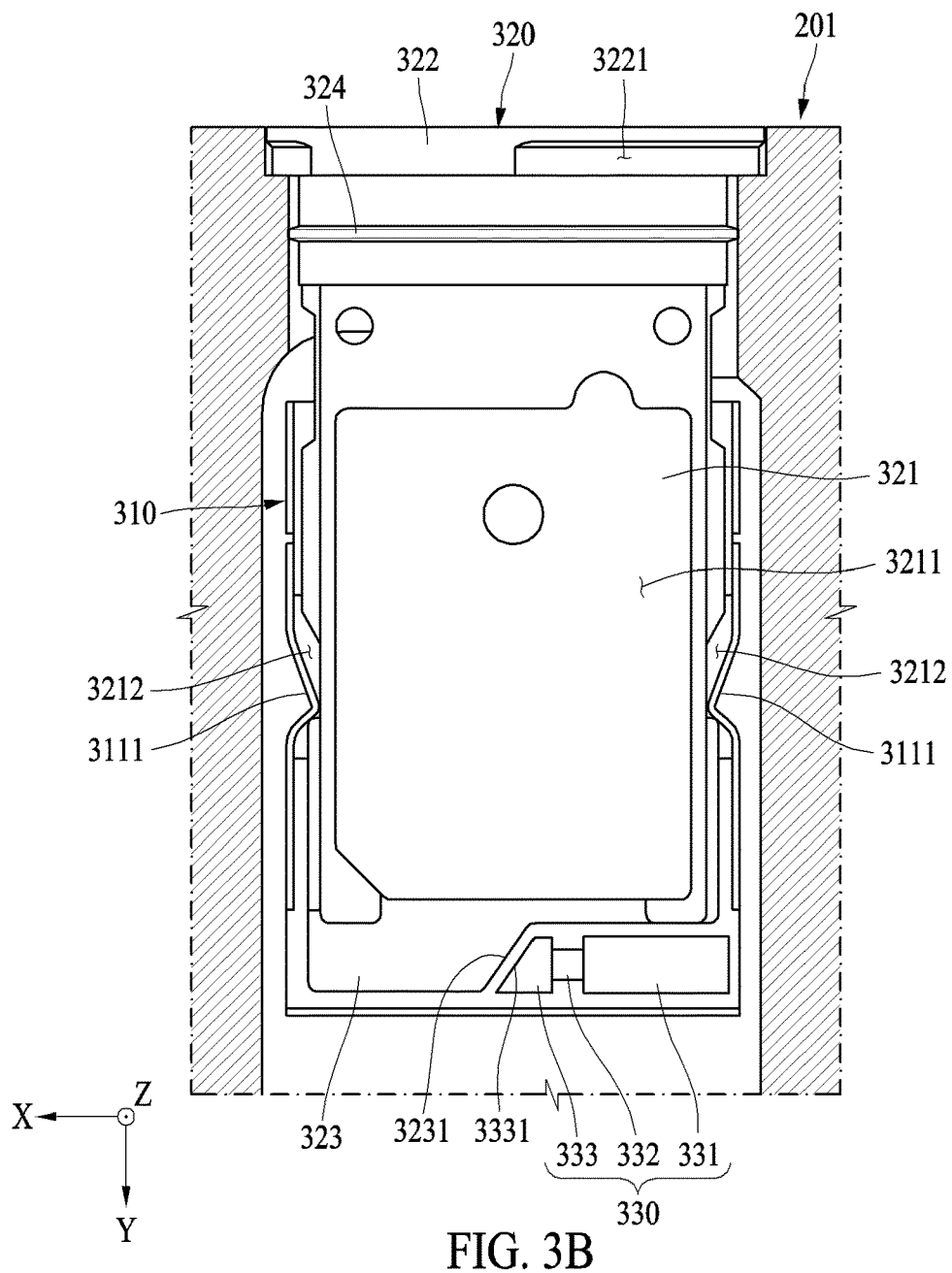
FIG. 3B is a plan view illustrating the inside of the socket of FIG. 3A.

Referring to FIGS. 2A, 2B, and 2C, an electronic device 201 (e.g., the electronic device 101 of FIG. 1) according to an embodiment may include a housing 210, a support member 220, a display 230, a battery 240, a printed circuit board (PCB) 250, a socket 310, a tray 320, and an actuator (e.g., an actuator 330 of FIG. 3B).

In an embodiment, the housing 210 may form at least a portion of an exterior of the electronic device 201. The housing 210 may form a front surface 210a (e.g., a first surface), a rear surface 210b (e.g., a second surface), and a side surface 210c (e.g., a third surface) surrounding an inner space between the front surface 210a and the rear surface 210b. For example, the housing 210 may include a first plate 211 (e.g., a front plate), a second plate 212 (e.g., a rear plate), and a side member 213 (e.g., a side bezel structure).

In an embodiment, the front surface 210a may be formed by the first plate 211 of which at least a portion is substantially transparent. For example, the first plate 211 may include a polymer plate or a glass plate including at least one coating layer. In an embodiment, the rear surface 210b may be formed of the second plate 212 which is substantially opaque. For example, the second plate 212 may be formed of coated or tinted glass, ceramic, polymer, metal (e.g., aluminum, stainless steel, or magnesium), or a combination thereof. The side surface 210C may be coupled to the first plate 211 and the second plate 212 and may be formed by the side member 213 including metal and/or polymer. In an embodiment, the second plate 212 and the side member 213 may be integrally and seamlessly formed. In an embodiment, the second plate 212 and the side member 213 may be formed of substantially the same material (e.g., aluminum).

In an embodiment, the side member 213 may surround at least a portion of the inner space between the front surface 210a and the rear surface 210b. The support member 220 may be disposed in the inner space of the housing 210. For example, the support member 220 may be connected to the side member 213 or may be formed integrally with the side member 213. The support member 220 may form an arrangement space of components of the electronic device 201. For example, the support member 220 may connect the edges of the first plate 211 and the second plate 212 and surround a space between the first plate 211 and the second plate 212. For example, the display 230 may be coupled to one surface (e.g., a surface in a +z direction) of the support member 220. However, this is an example, and the position and/or number of the support member 220 is not limited thereto.

In an embodiment, the electronic device 201 may include the display 230 (e.g., the display module 160 of FIG. 1). In an embodiment, the display 230 may be positioned on the front surface 210a. In an embodiment, the display 230 may be visible through at least a portion of the first plate 211. In an embodiment, the display 230 may have a shape that is substantially the same as a shape of an outer edge of the first plate 211. In an embodiment, the periphery of the display 230 may substantially coincide with the outer edge of the first plate 211.

In an embodiment, the battery 240 (e.g., the battery 189 of FIG. 1) and/or the PCB 250 may be seated and supported in a space formed by the support member 220. For example, the battery 240 may be disposed or provided in a first space 221 formed by the support member 220. For example, the PCB 250 may include a first PCB 251 and a second PCB 252. The first PCB 251 and the second PCB 252 may be electrically connected to each other. For example, the first PCB 251 may be disposed in a second space 222 formed by the support member 220. For example, the second PCB 252 may be disposed in a third space 223 formed by the support member 220.

In an embodiment, an opening 214 may be formed on one side of the housing 210. For example, the opening 214 may be formed in the side member 213. In FIGS. 2A, 2B, and 2C, the opening 214 is shown as being formed at a lower end (e.g., a −y direction end) of the electronic device 201, but this is an example, and the position of the opening 214 is not limited thereto. In one embodiment, the opening 214 may be formed at an upper end (e.g., a +y direction end) and/or a side end (e.g., a +/−x direction end) of the electronic device 201.

In an embodiment, the socket 310 and the tray 320 may be configured to connect external components to the electronic device 201. For example, the external component may be a card-shaped component, an external memory card, a subscriber identification module card, a user identity module card, an external USB, a communication transmission/reception module, an external battery, or components of various types and purposes that may be combined and separated from the electronic device 201.

In an embodiment, a space for accommodating the tray 320 may be formed inside the socket 310. An inner space of the socket 310 may communicate with the opening 214. The socket 310 may be disposed inside the housing 210 such that the inner space aligns with the opening 214. The socket 310 may be disposed on the second PCB 252. At least a portion of the socket 310 may be electrically connected to an electric element disposed on the second PCB 252. However, this is an example and a position at which the socket 310 is disposed is not limited thereto. In one embodiment, when the opening 214 is formed at the upper end (e.g., the +y direction end) and/or the side end (e.g., the +/−x direction end) of the electronic device 201, the socket 310 may be disposed on the first PCB 251. The socket 310 may be electrically connected to an external component seated on the tray 320. For example, in a state in which the tray 320 on which the external component is seated is inserted into the socket 310, the socket 310 may electrically contact at least a portion of the external component. However, this is an example, and a separate component electrically connecting an external component to the electronic device 201 may be provided.

In an embodiment, the tray 320 may accommodate an external component. The external component may be seated on the tray 320. The tray 320 may be insertable into the socket 310 through the opening 214. The tray 320 may be removable from the socket 310 through the opening 214.

Figure 3C:
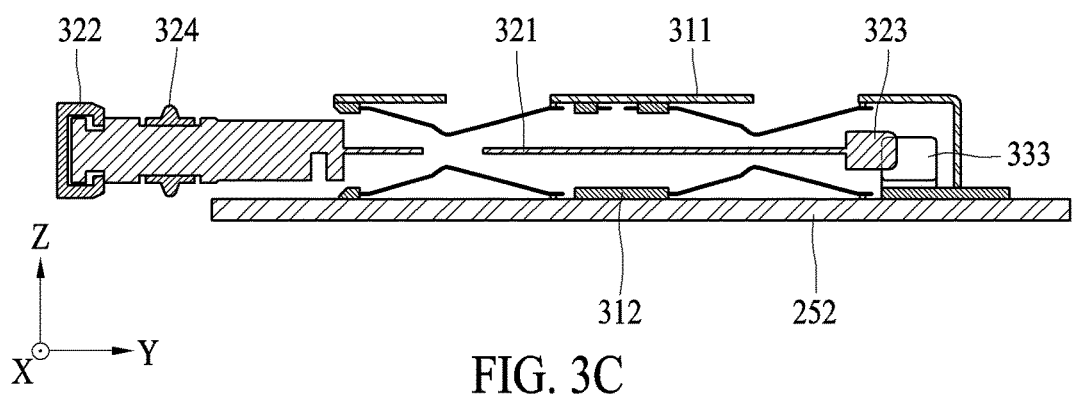
FIG. 3C is a cross-sectional view taken along line A-A of FIG. 3A.

FIG. 3A is a perspective view illustrating a state in which a tray is inserted into a socket according to an embodiment. FIG. 3B is a plan view illustrating the inside of the socket of FIG. 3A. FIG. 3C is a cross-sectional view taken along line A-A of FIG. 3A.

Referring to FIGS. 3A, 3B, and 3C, in an embodiment, the socket 310 may be disposed on the second PCB 252. The socket 310 may include a first part 311 and a second part 312. The first part 311 and the second part 312 may be disposed adjacent to each other so that a space capable of accommodating the tray 320 is formed therein. For example, the first part 311 and/or the second part 312 may be formed of an electrically conductive material. For example, the first part 311 and/or the second part 312 may be formed of a material having its own elastic force. For example, a latch 3111 may be formed in the first part 311. The latch 3111 may be formed by bending a portion of each end of the first part 311 in a width direction (e.g., an x direction) inward. The latch 3111 may be elastically deformable. However, this is an example, and the socket 310 may be integrally formed.

In an embodiment, the tray 320 may include a tray body 321, a tray head 322, a protrusion 323, and a waterproof member 324.

In an embodiment, an external component may be seated on the tray body 321. At least one space (or area) 3211 accommodating an external component may be formed in the tray body 321. The space 3211 for accommodating an external component shown in FIG. 3B is an example, and the shape, position, and/or number of the space 3211 for accommodating the external component are not limited thereto. For example, the tray body 321 may include two spaces separated from each other to accommodate two external components (e.g., a SIM card and a memory card). For example, the tray body 321 may be substantially formed in a plate shape. The tray body 321 may have a longitudinal direction in a direction (e.g., a y direction) in which the tray 320 is inserted into the socket 310. Hereinafter, in one embodiment, the direction (e.g., the y direction) in which the tray 320 is inserted into the socket 310 is referred to as the longitudinal direction (e.g., the y direction) of the tray 320, and a direction perpendicular to the longitudinal direction (e.g., the y direction) of the tray 320 is referred to as a width direction (e.g., an x direction) of the tray 320. In one embodiment, a length of the tray 320 in the longitudinal direction (e.g., the y direction) may not be longer than a length of the tray 320 in the width direction (e.g., the x direction), and the tray 320 may be formed in various shapes.

In an embodiment, a notch 3212 may be formed at each end of the tray body 321 in a width direction (e.g., an x direction). The notch 3212 may be formed in a shape in which a portion of the tray body 321 is recessed inward. In a state in which the tray 320 is inserted into the socket 310, the latch 3111 formed in the socket 310 may be engaged with the notch 3212. When the tray 320 starts to be inserted into the socket 310, the latch 3111 may be elastically deformed while being pushed outward by contact with an end of the tray body 321 in the width direction (e.g., the x direction). Then, when the tray 320 is further inserted into the socket 310 and the latch 3111 is positioned at the notch 3212 portion of the tray body 321, the shape of the latch 3111 may be restored to its original shape. In this state, since the latch 3111 is engaged with the notch 3212, the state in which the tray 320 is inserted into the socket 310 may be maintained unless an external force is applied to the extent that the latch 3111 is deformed.

In an embodiment, the tray head 322 may be formed at one end (e.g., a −y direction end) of the tray body 321 in the longitudinal direction (e.g., the y direction). In a state in which the tray 320 is inserted into the socket 310, the tray head 322 may be positioned in the opening 214 of the housing 210. The tray head 322 may be formed in a shape substantially corresponding to the opening 214. For example, the tray head 322 may be formed with a width (e.g., a width in an x direction) greater than the tray body 321. A gripping groove 3221 may be formed in the tray head 322. The gripping groove 3221 may be formed by recessing at least a portion of the tray head 322. For example, a thickness (e.g., a thickness in the y direction) of the tray head 322 may be 1.2 mm. For example, a thickness (e.g., a thickness in the y direction) of the gripping groove 3221 may be 0.5 mm. However, this is an example, and the shape of the tray head 322 and/or the gripping groove 3221 are not limited thereto.

In an embodiment, the protrusion 323 may be formed at the other end (e.g., a +y direction end) of the tray body 321 in the longitudinal direction (e.g., the y direction). The protrusion 323 may be positioned in a direction opposite the tray head 322. In a state in which the tray 320 is inserted into the socket 310, the protrusion 323 may be positioned opposite the opening 214 of the housing 210. The protrusion 323 may protrude in the longitudinal direction (e.g., the y direction) of the tray body 321 from the other end (e.g., the +y direction end) of the tray body 321 in the longitudinal direction (e.g., the y direction). For example, a length in which the protrusion 323 protrudes in the longitudinal direction (e.g., the y direction) of the tray body 321 from the other end (e.g., the +y direction end) of the tray body 321 in the longitudinal direction (e.g., the y direction) may be 1 mm to 2 mm. For example, a length in which the protrusion 323 protrudes in the longitudinal direction (e.g., the y direction) of the tray body 321 from the other end (e.g., the +y direction end) of the tray body 321 in the longitudinal direction (e.g., the y direction) may be 1.4 mm. The protrusion 323 may be formed in some sections of the end (e.g., the +y direction end) of the tray body 321 so that a space in which the actuator 330 described below is disposed may be formed between the end (e.g., the +y direction end) of the tray body 321 and the socket 310. However, this is an example, and the shape of the protrusion 323 is not limited thereto.

In an embodiment, a first inclined surface 3231 may be formed on one side of the protrusion 323. The first inclined surface 3231 may be inclined at an angle of 30 degrees to 60 degrees with respect to the width direction (e.g., the x direction) of the tray 320. However, this is an example, and the inclination angle of the first inclined surface 3231 is not limited thereto.

In an embodiment, the waterproof member 324 may be connected to the tray body 321 so as to be adjacent to the tray head 322. For example, in a state in which the tray 320 is inserted into the socket 310, the waterproof member 324 may be positioned adjacent to the opening 214. In a state in which the tray 320 is inserted into the socket 310, the waterproof member 324 may prevent fluid and/or foreign substances from entering the electronic device (e.g., the electronic device 201 of FIG. 2A) through the opening 214. For example, the waterproof member 324 may be formed of any one or any combination of rubber, silicone, and synthetic resin. However, this is an example, and the material of the waterproof member 324 is not limited thereto.

In an embodiment, the actuator 330 may generate power to remove the tray 320 from the socket 310. The actuator 330 may be disposed in the inner space of the socket 310. For example, in a state in which the tray 320 is inserted into the socket 310, the actuator 330 may be disposed in a space between an inner end (e.g., the +y direction end) of the tray body 321 in the longitudinal direction (e.g., the y direction) and the socket 310. The actuator 330 may be disposed along the width direction (e.g., the x direction) of the tray 320. The actuator 330 may generate power in a linear direction parallel to the width direction (e.g., the x direction) of the tray 320. The operation of the actuator 330 may be controlled by a processor (e.g., the processor 120 of FIG. 1).

In an embodiment, the actuator 330 may include a power source 331, a rod 332, and a block 333. The power source 331 may generate power in a linear direction parallel to the width direction (e.g., the x direction) of the tray 320. The rod 332 may be connected to the power source 331 so as to be parallel to the width direction (e.g., the x direction) of the tray 320. The rod 332 may be disposed toward the protrusion 323 of the tray 320. For example, an end (e.g., a +x direction end) of the rod 332 may face the protrusion 323 of the tray 320. The block 333 may be connected to the end (e.g., the +x direction end) of the rod 332. In a state in which the tray 320 is inserted into the socket 310, the block 333 may be disposed adjacent to the protrusion 323 of the tray 320. The rod 332 and the block 333 may move in a translational direction along the width direction (e.g., the x direction) of the tray 320 by power provided by the power source 331.

In an embodiment, a second inclined surface 3331 may be formed on one side of the block 333. The second inclined surface 3331 may correspond to the first inclined surface 3231 of the protrusion 323. For example, the second inclined surface 3331 may be formed in opposite inclined directions so as to be in surface contact with the first inclined surface 3231. An inclination angle of the second inclined surface 3331 may correspond to an inclination angle of the first inclined surface 3231. As shown in FIG. 3C, when the tray 320 and the actuator 330 are viewed from the side, at least a portion of the protrusion 323 and the block 333 may overlap with each other. A width (e.g., a width in a y direction) of the block 333 may correspond to the length in which the protrusion 323 protrudes in the longitudinal direction (e.g., the y direction) of the tray body 321 from the end (e.g., the +y direction end) of the tray body 321. For example, the width (e.g., the width in the y direction) of the block 333 may be 1 mm to 2 mm. For example, the width (e.g., the width in the y direction) of the block 333 may be 1.4 mm. However, this is an example, and the shape of the block 333 is not limited thereto.

Figure 3D:
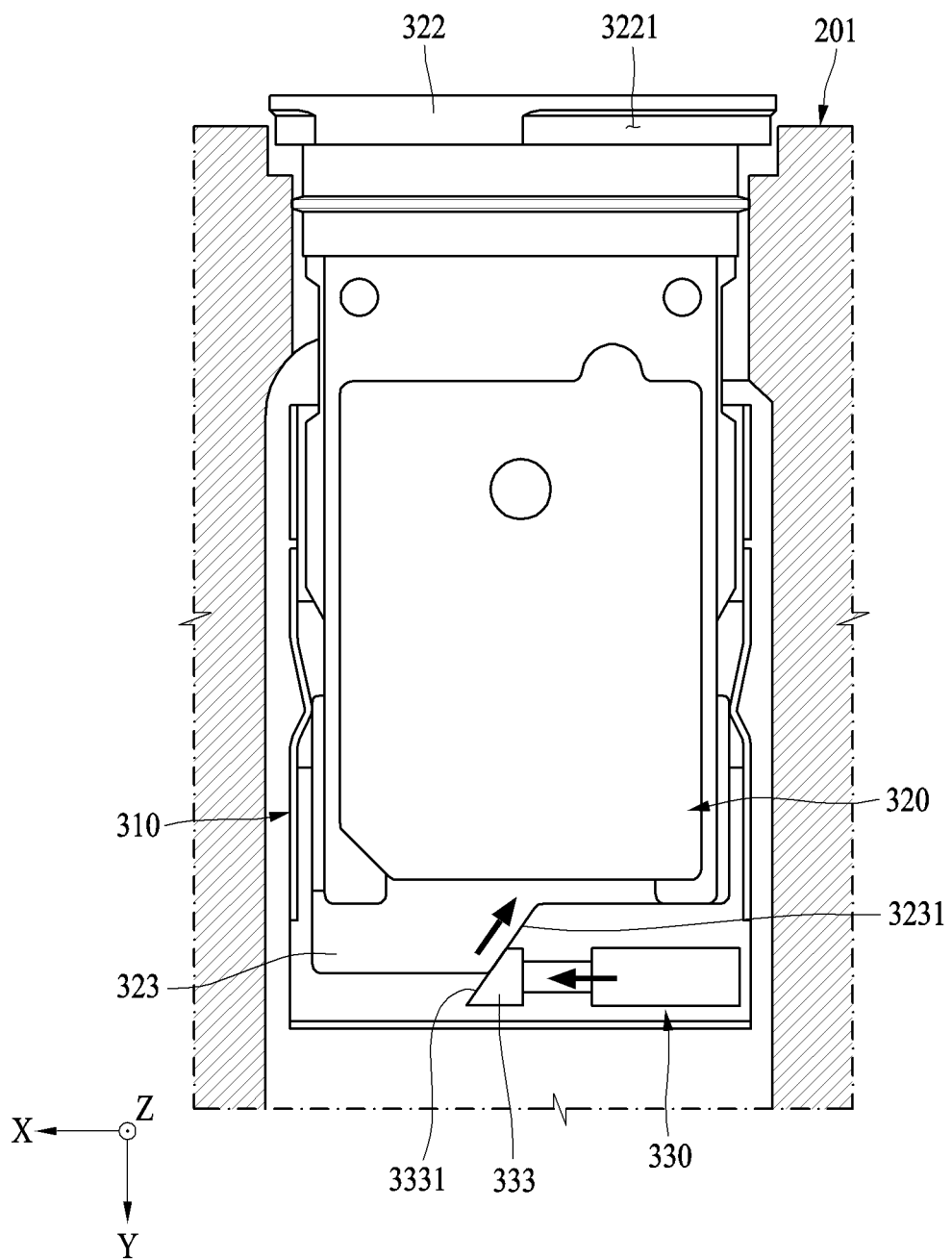
FIGS. 3D to 3F are plan views illustrating a process in which a tray is removed from a socket by an operation of an actuator, according to an embodiment.
Figure 3E:
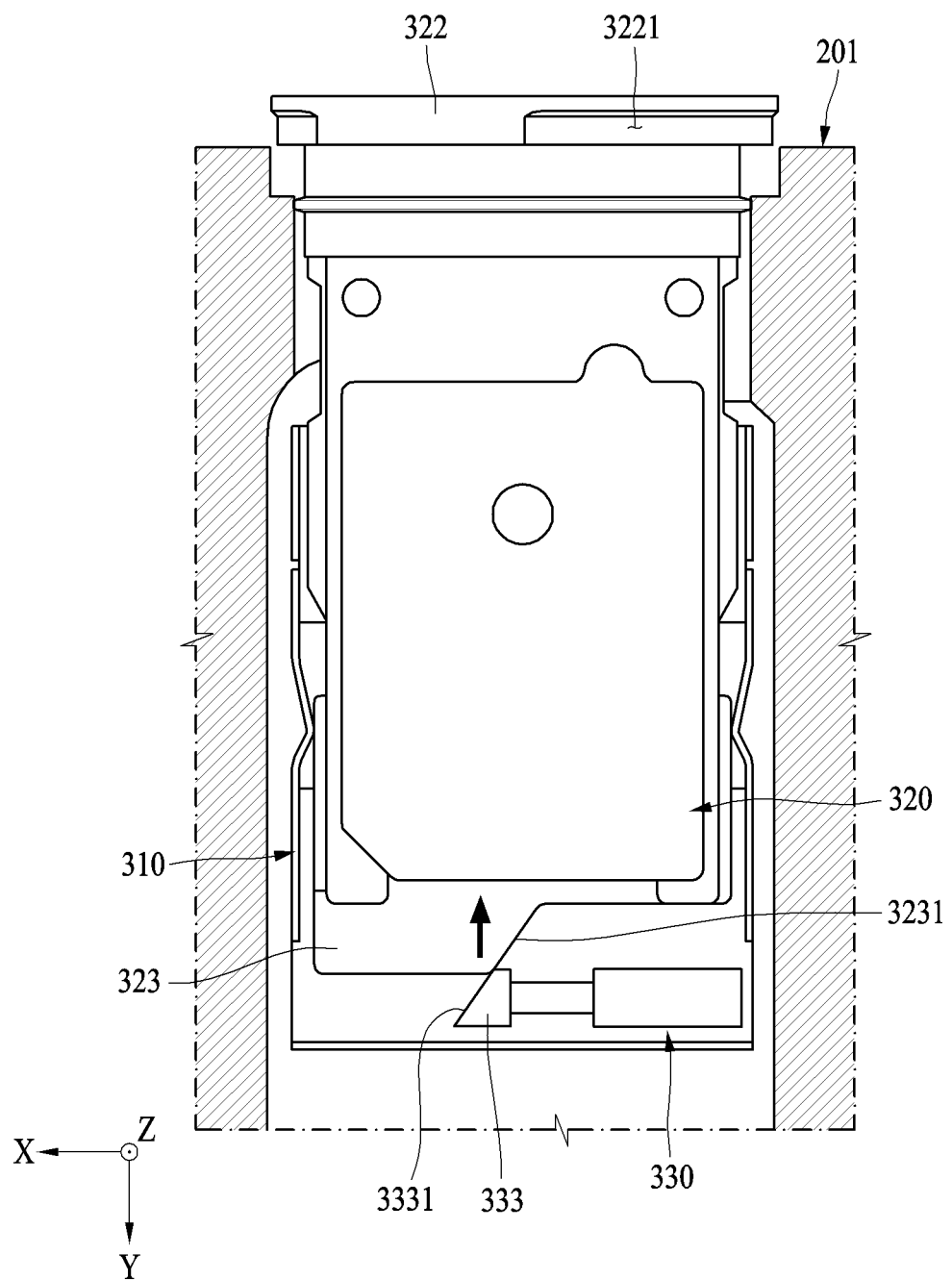
Figure 3F:
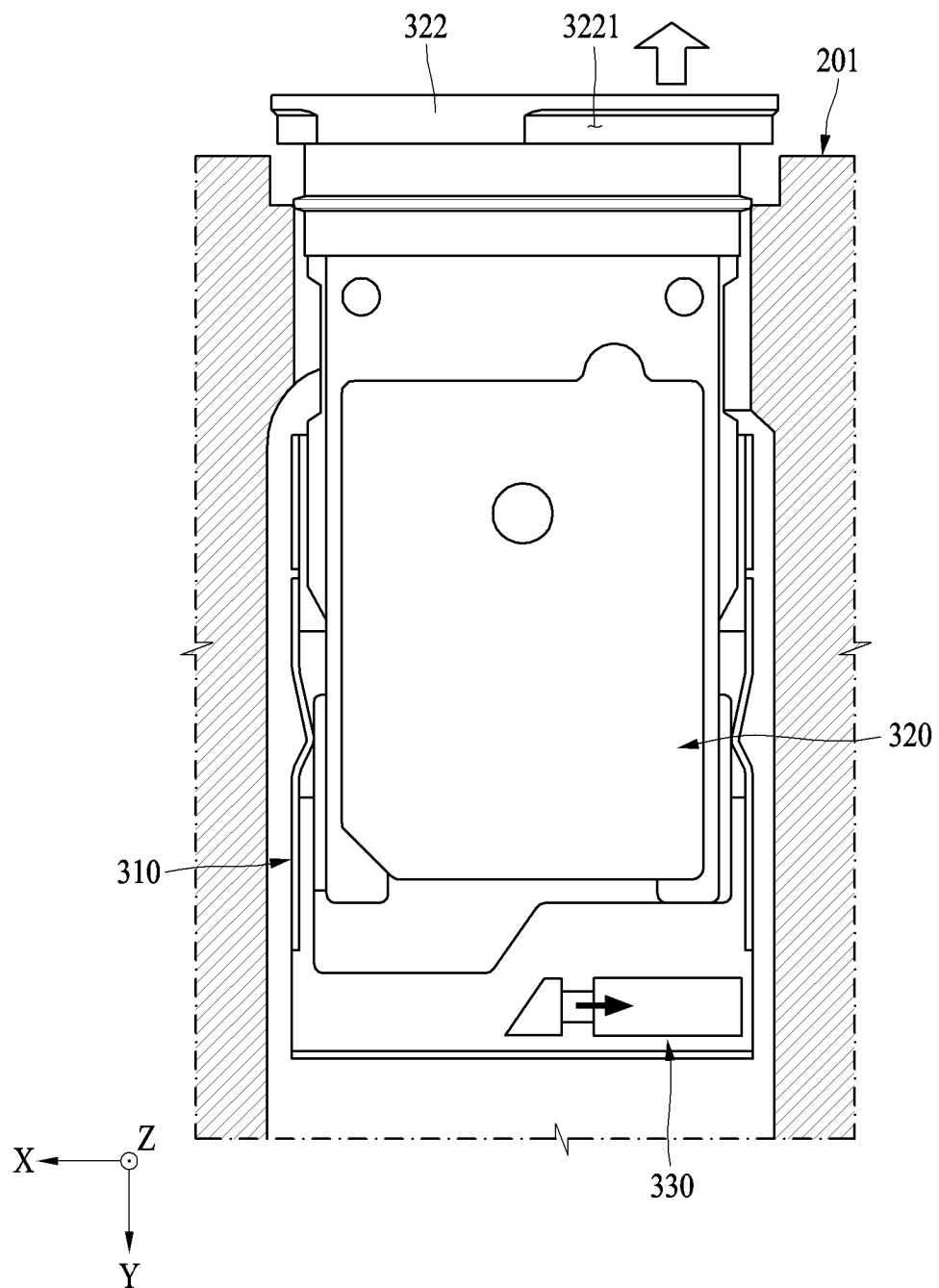

FIGS. 3D to 3F are plan views illustrating a process in which a tray is removed from a socket by an operation of an actuator, according to an embodiment. FIG. 3H is an exemplary screen displayed on a display of an electronic device according to an embodiment. FIG. 3I is an exemplary screen displayed on a display of an electronic device according to an embodiment. FIG. 3J is an exemplary screen displayed on a display of an electronic device according to an embodiment.

Hereinafter, a process in which a tray is removed from a socket by an operation of an actuator is described with reference to FIGS. 3D to 3F.

In an embodiment, a user may input an instruction for removing the tray 320 from the socket 310 to an electronic device (e.g., the electronic device 201 of FIG. 2A). For example, the user may input an instruction for removing the tray 320 through a button displayed on a display (e.g., the display 230 of FIG. 2A) of the electronic device 201. For example, an operation command of the actuator 330 may be input through a button displayed on the display 230 of the electronic device 201. For example, when the electronic device 201 is driven for the first time, a screen as shown in FIG. 3H may be displayed, and a button 231 for removing the tray 320 may be displayed on the display 230 as shown in FIG. 3I. For example, on a setting screen of the electronic device 201 as shown in FIG. 3J, a button 232 for removing the tray 320 may be displayed on the display 230. However, this is an example, and the button for removing the tray 320 is not limited thereto. For example, the button for removing the tray 320 may be implemented as a physical button. When the user presses the button for removing the tray 320, a processor (e.g., the processor 120 of FIG. 1) may proceed with a procedure for authenticating the user before operating the actuator 330. For example, a user authentication procedure may appear on the display 230. For example, the user authentication procedure may include any one of password input, pin number input, pattern input, fingerprint recognition, face recognition, iris recognition, or biometric recognition. However, this is an example, and the user authentication procedure is not limited thereto. The actuator 330 may operate after the user authentication procedure is completed. For example, when the user authentication procedure is completed, the processor 120 may drive the actuator 330 to remove the tray 320. According to the above-described configuration, since it is possible to prevent someone other than the user from removing the tray 320, security may be improved. However, this is an example, and the actuator 330 may be operated by the processor 120 without a separate user authentication procedure after the button for removing the tray 320 is pressed.

In an embodiment, when an operation command is input into the actuator 330 by the processor (e.g., the processor 120 of FIG. 1) in a state in which the tray 320 is inserted into the socket 310, the actuator 330 may remove the tray 320 from the socket 310 by pressing the protrusion 323 of the tray 320. For example, as shown in FIG. 3D, the actuator 330 may translate the block 333 toward the protrusion 323. In this state, the second inclined surface 3331 of the block 333 may make surface contact with the first inclined surface 3231 of the protrusion 323. In a state in which the first inclined surface 3231 and the second inclined surface 3331 are in surface contact with each other, the actuator 330 may press the first inclined surface 3231 in the width direction (e.g., the x direction) of the tray 320. The first inclined surface 3231 may slide along the second inclined surface 3331 by the pressing force of the actuator 330, and accordingly, the tray 320 may slide in a direction (e.g., a −y direction) to be removed from the socket 310. As shown in FIG. 3E, when the actuator 330 moves the block 333 to the end, the tray 320 may be separated from the socket 310 by a predetermined distance. For example, in a state shown in FIG. 3E, a length by which the tray 320 is separated from the socket 310 may correspond to the length in which the protrusion 323 protrudes in the longitudinal direction (e.g., the y direction) of the tray body 321 from the end (e.g., the +y direction end) of the tray body 321. In the state shown in FIG. 3E, the tray head 322 may be exposed to the outside of the electronic device 201. For example, in the state shown in FIG. 3E, the gripping groove 3221 formed in the tray head 322 may be exposed to the outside of the electronic device 201. For example, as shown in FIG. 3F, the user may remove the tray 320 from the socket 310 using the gripping groove 3221 exposed to the outside.

In an embodiment, as shown in FIG. 3F, when the tray 320 is removed from the socket 310, the actuator 330 may return to its original state. For example, the actuator 330 may press the first inclined surface 3231 of the protrusion 323 in the width direction (e.g., the x direction) of the tray 320, and then return to its original state after a designated time elapses. For example, the processor (e.g., the processor 120 of FIG. 1) may issue an instruction to return the actuator 330 to its original state after a designated time elapses after driving the actuator 330 so that the tray 320 is removed. For example, when it is confirmed that the tray 320 has been removed from the socket 310 after the actuator 330 presses the first inclined surface 3231 of the protrusion 323 in the width direction (e.g., the x direction) of the tray 320, the actuator 330 may return to its original state. For example, when an external component accommodated in the tray 320 is a SIM card, the processor 120 may recognize that a signal communicating with the SIM card has disappeared and confirm that the tray 320 has been removed from the socket 310. When it is confirmed that the tray 320 is removed from the socket 310, the processor 120 may issue an instruction to return the actuator 330 to its original state. However, this is an example, and a method of confirming that the tray 320 is removed from the socket 310 is not limited thereto. For example, a sensor for confirming that the tray 320 is removed from the socket 310 may be provided.

In a structure according to an embodiment, a pressing direction (e.g., an x direction) of the actuator 330 and a direction (e.g., a y direction) in which the tray 320 is removed from the socket 310 may be substantially perpendicular to each other. The pressing force of the tray 320 transmitted to the protrusion 323 by the actuator 330 in the width direction (e.g., the x direction) of the tray 320 may be converted into a pressing force in the longitudinal direction (e.g., the y direction) of the tray 320 by the inclination angles of the first inclined surface 3231 and the second inclined surface 3331. Therefore, in a state in which the tray 320 is inserted into the socket 310, the actuator 330 may press the first inclined surface 3231 in the width direction (e.g., the x direction) of the tray 320 and may remove the tray 320 from the socket 310 in the longitudinal direction (e.g., the y direction) of the tray 320. According to the above-described structure, since the actuator 330 directly presses the tray 320, the removal mechanism may be simplified. In the structure according to an embodiment, since the tray 320 is directly pressed, power loss during power transmission may be reduced and the possibility of parts being damaged during operation may be reduced.

For example, a comparative example may be configured to remove the tray by inserting an ejector pin into a separate opening to actuate a lever. Compared to the comparative example described above, the structure according to the embodiment may omit some components (e.g., an ejector pin, a separate opening, and/or a lever). Accordingly, the structure according to the embodiment may omit some components compared to the comparative example described above, and thus, a wider inner arrangement space may be secured. Compared to the comparative example described above, the structure according to the embodiment may omit a separate opening for inserting an ejector pin, and thus, waterproof performance may be improved. Compared to the comparative example described above, since the structure according to the embodiment may omit the separate opening for inserting the ejector pin, a width (e.g., a width in an x direction) of the tray head 322 exposed to the outside may be shortened and formed symmetrically. Accordingly, the appearance of the structure according to the embodiment may be improved compared to the comparative example described above. Since the structure according to the embodiment may not require a process of inserting the ejector pin compared to the comparative example described above, it may be possible to prevent an issue of incorrectly inserting the ejector pin into another opening (e.g., a microphone hole). Since the structure according to the embodiment may not require a process of inserting the ejector pin compared to the comparative example described above, it may be possible to prevent damage to the exterior of the electronic device 201 during the process of inserting the ejector pin.

Figure 3G:
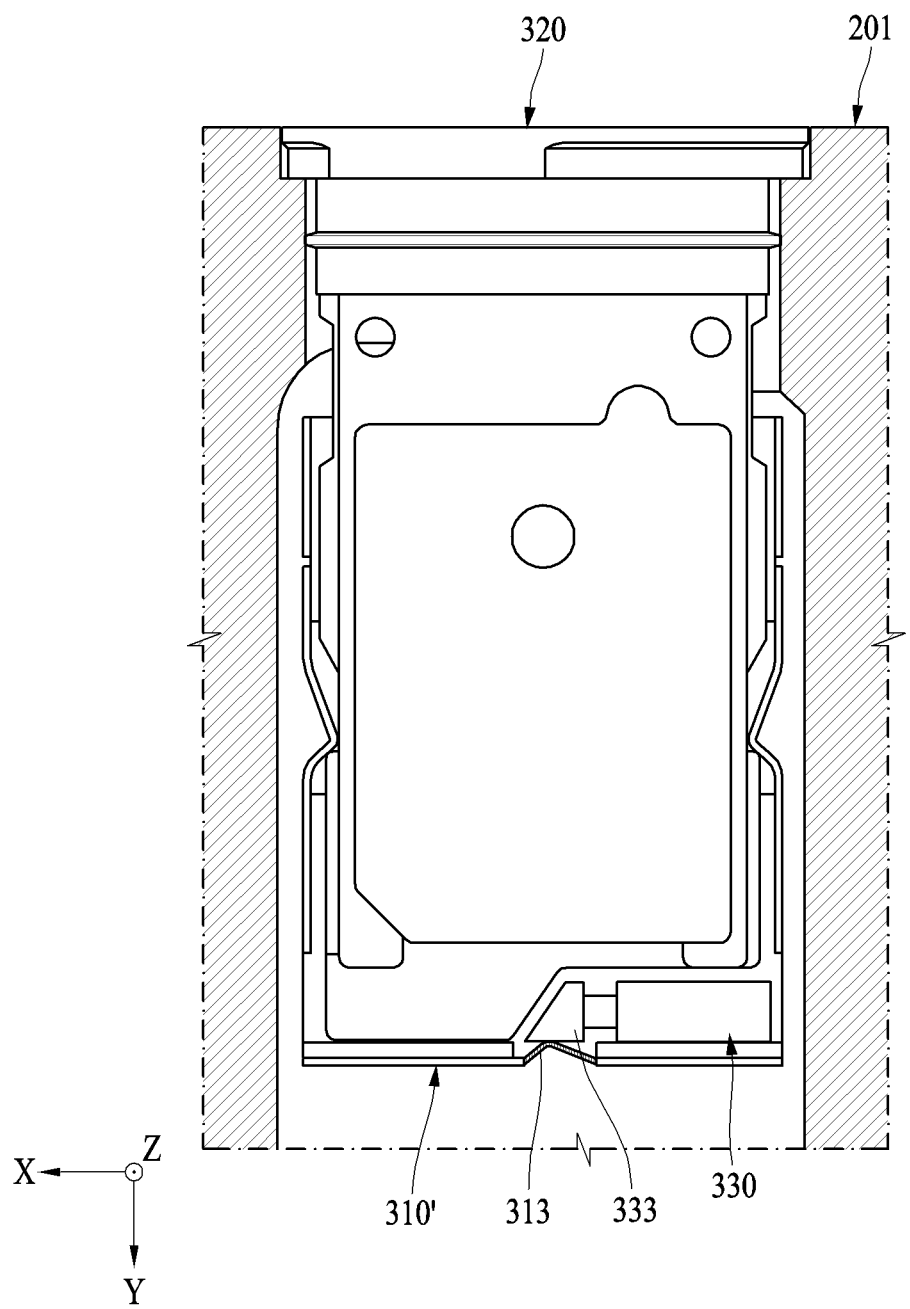
FIG. 3G is a plan view illustrating the inside of a socket in a state in which a tray is inserted into the socket, according to an embodiment.
Figure 3H:
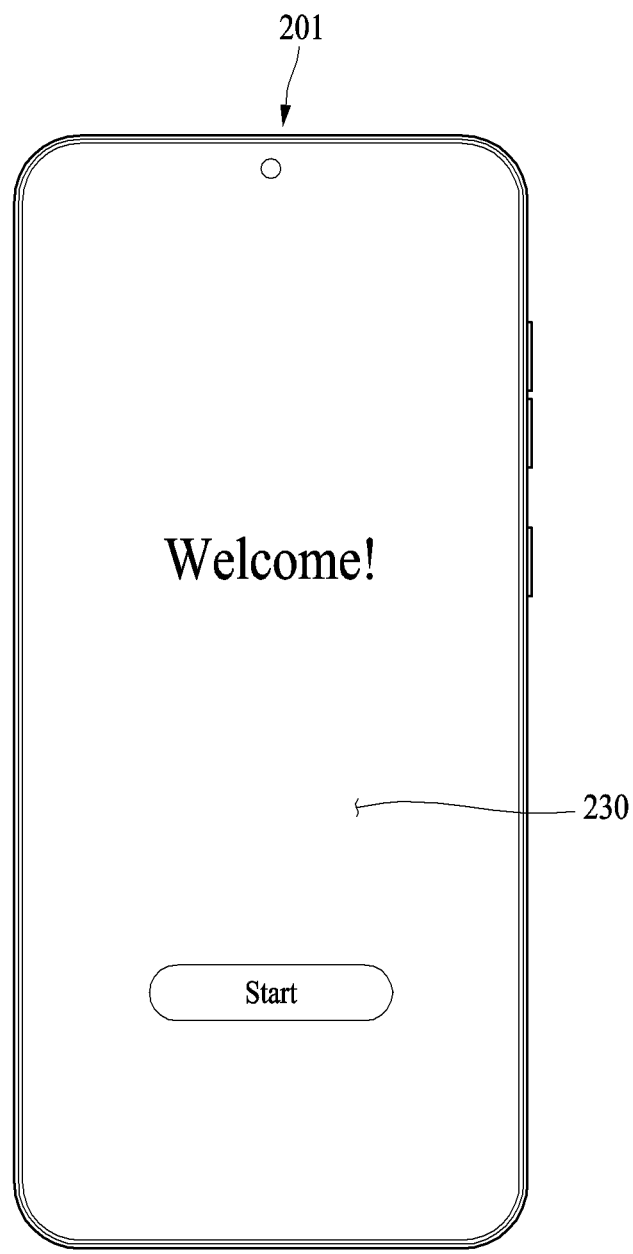
FIG. 3H is an exemplary screen displayed on a display of an electronic device according to an embodiment.
Figure 3I:
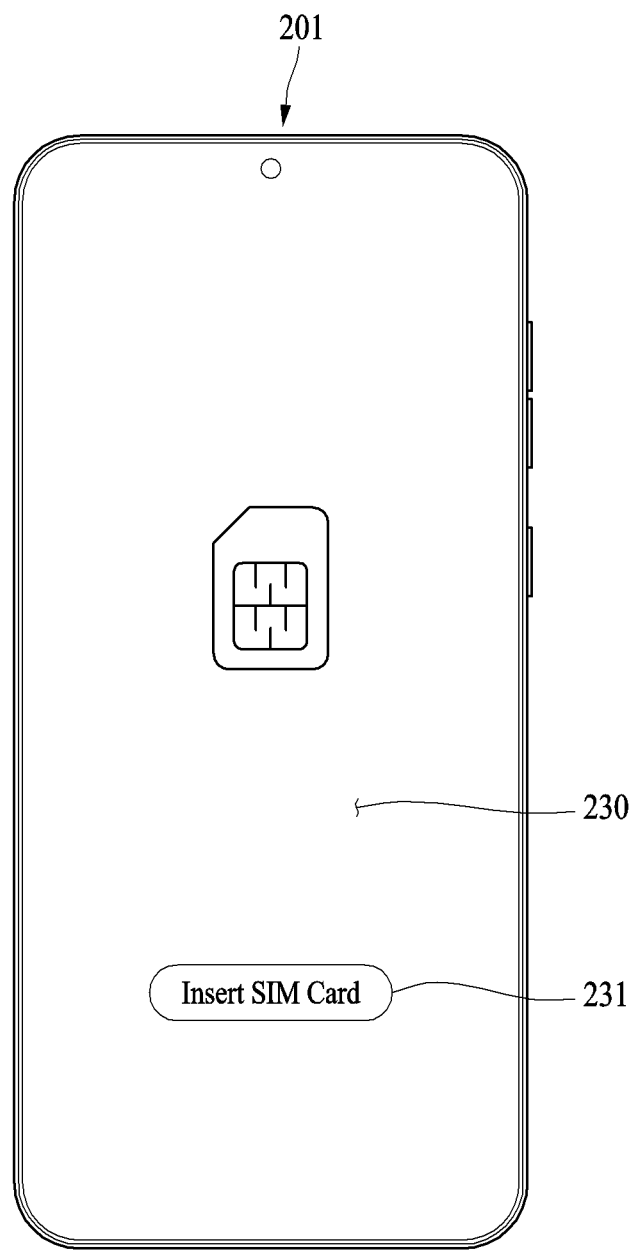
FIG. 3I is an exemplary screen displayed on a display of an electronic device according to an embodiment.
Figure 3J:
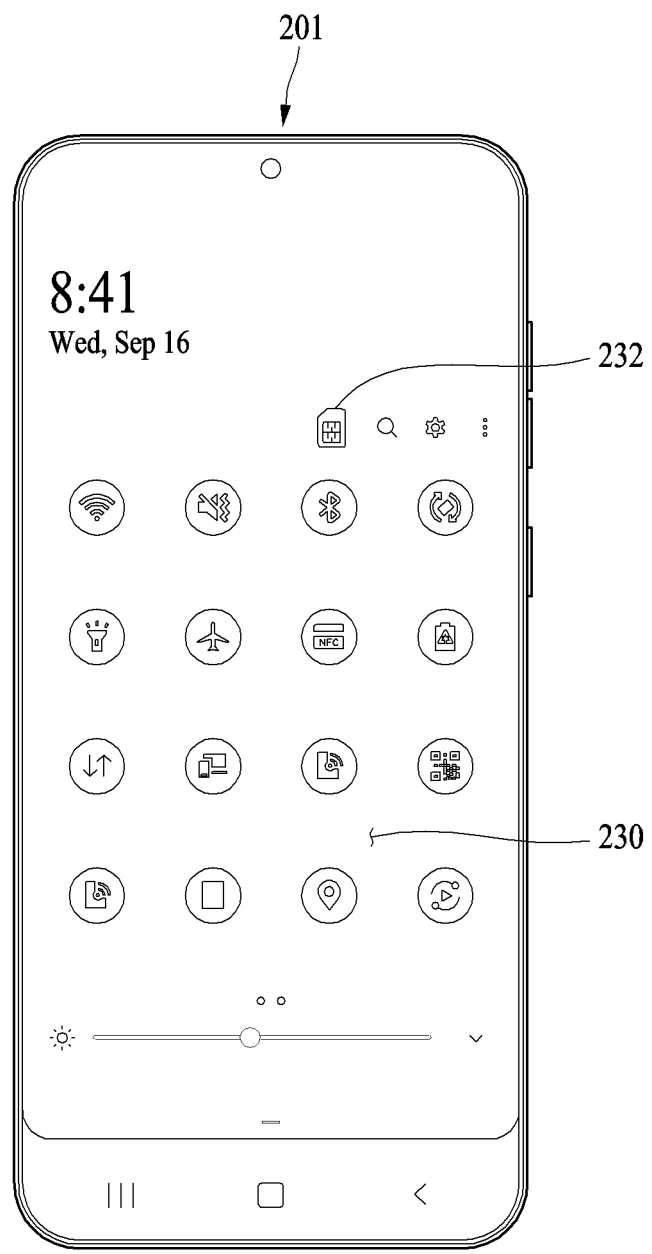
FIG. 3J is an exemplary screen displayed on a display of an electronic device according to an embodiment.

FIG. 3G is a plan view illustrating the inside of a socket in a state in which a tray is inserted into the socket, according to an embodiment.

Referring to FIG. 3G, in describing a socket 310' according to an embodiment, the description of the socket 310 described with reference to FIGS. 2A to 3F will be applied to the extent that the descriptions do not conflict with each other.

In an embodiment, the socket 310' may include an elastic deformable portion 313. The elastic deformable portion 313 may be formed to be elastically deformable. The elastic deformable portion 313 may be formed at a position adjacent to the actuator 330. For example, the elastic deformable portion 313 may be positioned at an inner end (e.g., a +y direction end) of the socket 310' in a longitudinal direction (e.g., a y direction) so as to be adjacent to the actuator 330. For example, the elastic deformable portion 313 may be positioned adjacent to the block 333 of the actuator 330. For example, the elastic deformable portion 313 may be formed as a portion of a first part (e.g., the first part 311 of FIG. 3A). For example, the elastic deformable portion 313 may be formed by bending a portion of the first part 311. However, this is an example, and a position at which the elastic deformable portion 313 is formed is not limited thereto. For example, the elastic deformable portion 313 may be formed as a portion of a second part (e.g., the second part 312 of FIG. 3A). For example, the elastic deformable portion 313 may be formed as a separate component.

In an embodiment, the elastic deformable portion 313 may elastically support the actuator 330 on one side (e.g., a +y direction side). For example, the elastic deformable portion 313 may elastically support the block 333 on one side (e.g., a +y direction side). For example, in the process of removing the tray 320 from the socket 310 by operating the actuator 330, the actuator 330 may be pushed in a direction (e.g., a +y direction) opposite a direction (e.g., a -y direction) in which the tray 320 is removed by a reaction. In this example, the elastic deformable portion 313 may be elastically compressed by the displacement of the actuator 330 and may generate an elastic force in the -y direction to return the actuator 330 to its original position. Since the elastic deformable portion 313 elastically supports the actuator 330, it may be possible to compensate for the actuator 330 being pushed in a direction (e.g., a +y direction) opposite a direction (e.g., a -y direction) in which the tray 320 is removed due to a reaction in the process of the actuator 330 being operated.

In an embodiment, during the operation of the actuator 330, in order to compensate for the actuator 330 being pushed in a direction (e.g., a +y direction) opposite to a direction (e.g., a -y direction) in which the tray 320 is removed by a reaction, the actuator 330 may further include a guide rail. The guide rail may guide a moving path of the block 333. The guide rail may be disposed parallel to a width direction (e.g., an x direction) of the tray 320. Since the guide rail limits the moving path of the block 333 in the width direction (e.g., the x direction) of the tray 320, it may be possible to compensate for the actuator 330 being pushed in a direction (e.g., a +y direction) opposite a direction (e.g., a -y direction) in which the tray 320 is removed due to a reaction in the process of the actuator 330 being operated.

Figure 4A:
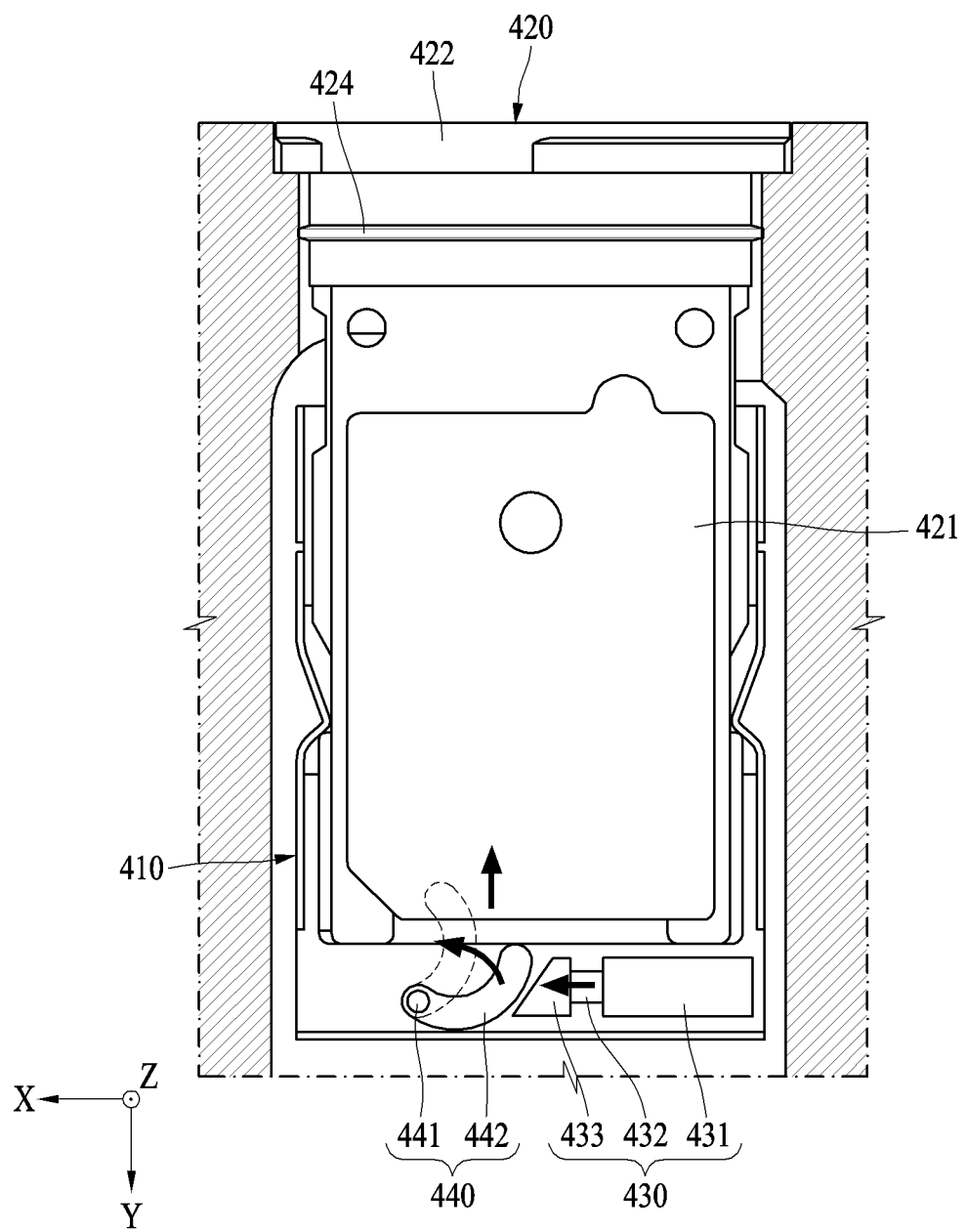
FIG. 4A is a plan view illustrating the inside of a socket in a state in which a tray is inserted into the socket, according to an embodiment.

FIG. 4A is a plan view illustrating the inside of a socket in a state in which a tray is inserted into the socket, according to an embodiment.

Referring to FIG. 4A, an electronic device (e.g., the electronic device 201 of FIG. 2A) according to an embodiment may include a housing (e.g., the housing 210 of FIG.

2C), a support member (e.g., the support member 220 of FIG. 2C), a display (e.g., the display 230 of FIG. 2C), a battery (e.g., the battery 240 of FIG. 2C), a PCB (e.g., the PCB 250 of FIG. 2C), a socket 410, a tray 420, an actuator 430, and a first intermediate structure 440.

Referring to FIG. 4A, a detailed description of a structure substantially the same as the structure described with reference to FIGS. 2A to 3F may be omitted.

In an embodiment, the tray 420 may include a tray body 421 (e.g., the tray body 321 of FIG. 3B), a tray head 422 (e.g., the tray head 322 of FIG. 3B), and a waterproof member 424 (e.g., the waterproof member 324 of FIG. 3B).

In an embodiment, the actuator 430 may generate power to remove the tray 420 from the socket 410. The actuator 430 may include a power source 431 (e.g., the power source 331 of FIG. 3B), a rod 432 (e.g., the rod 332 of FIG. 3B), and a block 433 (e.g., the block 333 of FIG. 3B). The block 433 may be formed to have a second inclined surface 4331 (e.g., the second inclined surface 3331 of FIG. 3B).

In an embodiment, in a state in which the tray 420 is inserted into the socket 410, the first intermediate structure 440 may be positioned adjacent to an inner end (e.g., a +y direction end) of the tray 420 in a longitudinal direction (e.g., ay direction). In a state in which the tray 420 is inserted into the socket 410, the actuator 430 may press the first intermediate structure 440 in a width direction (e.g., an x direction) of the tray 420 so that the first intermediate structure 440 removes the tray 420 from the socket 410.

In an embodiment, the first intermediate structure 440 may include a reference axis 441 and a rotating member 442.

In an embodiment, in a state in which the tray 420 is inserted into the socket 410, the reference axis 441 may be positioned adjacent to an inner end (e.g., a +y direction end) of the tray 420 in the longitudinal direction (e.g., the y direction). The reference axis 441 may be installed parallel to a thickness direction (e.g., a z direction) of the tray 420. The rotating member 442 may be rotatably connected to the reference axis 441. One end of the rotating member 442 may contact an inner end (e.g., a +y direction end) of the tray 420 in the longitudinal direction (e.g., the y direction). For example, the rotating member 442 may have a curved shape.

In an embodiment, when an operation command is input into the actuator 430 in a state in which the tray 420 is inserted into the socket 410, the actuator 430 may press the rotating member 442 so that the rotating member 442 rotates around the reference axis 441 in one direction (e.g., a counterclockwise direction). For example, the second inclined surface 4331 of the block 433 may rotate the rotating member 442 while being in contact with a curved portion of the rotating member 442. The rotating member 442 may be rotated with an end contacting an inner end (e.g., a +y direction end) of the tray 420 in the longitudinal direction (e.g., the y direction). As the rotating member 442 rotates, the end of the rotating member 442 pushes the tray 420 in a direction (e.g., a −y direction) to remove the tray 420, so the tray 420 may be removed from the socket 410. By the above-described structure, since the tray 420 indirectly receives a force of the actuator 430 at the inner end (e.g., the +y direction end) of the tray 420 formed in a linear shape, a possibility of the tray 420 being damaged due to stress concentration may be reduced. When the removed tray 420 is reinserted into the socket 410, the rotating member 442 may be returned to its original position by contacting the inner end (e.g., the +y direction end) of the tray 420.

Figure 4B:
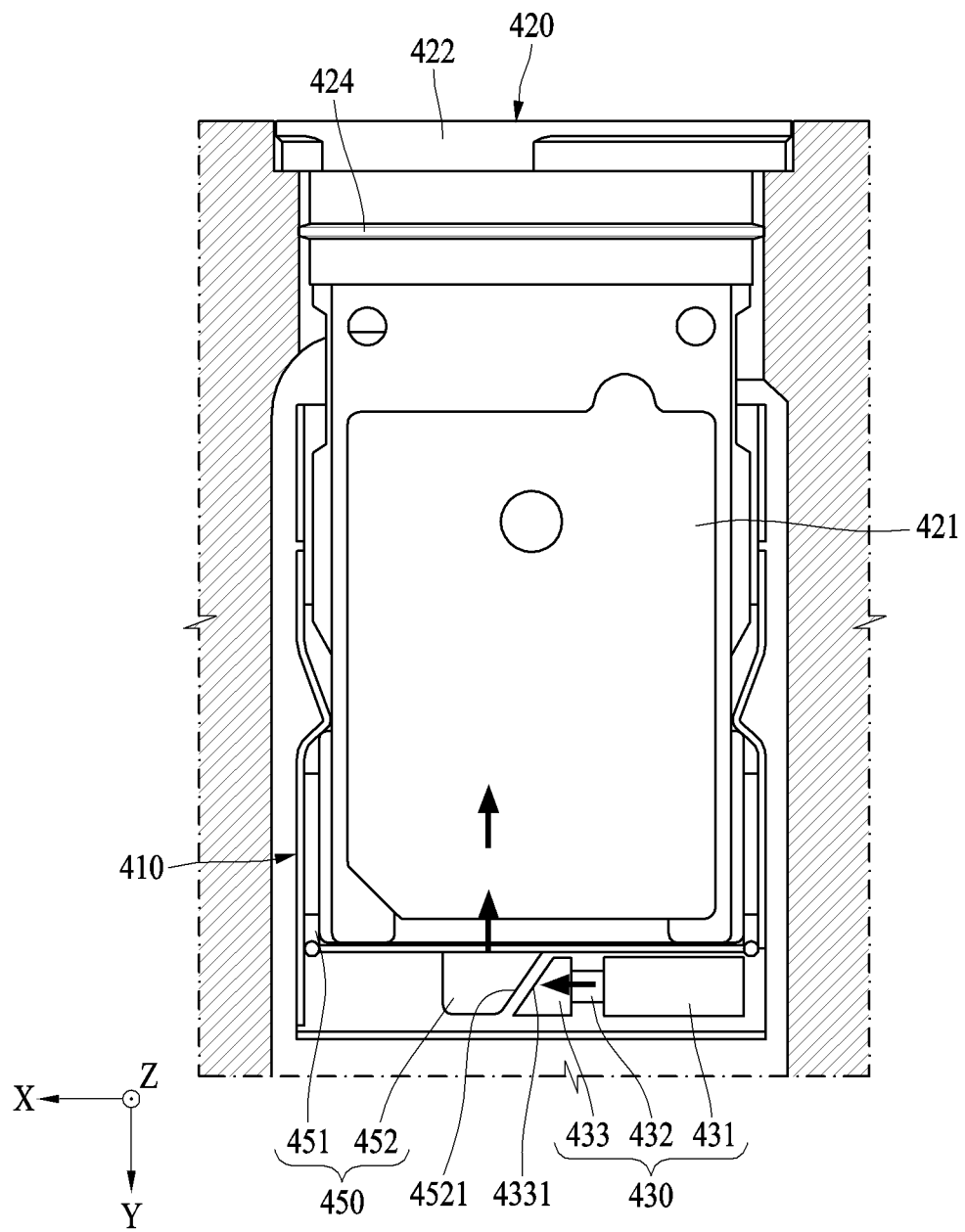
FIG. 4B is a plan view illustrating the inside of a socket in a state in which a tray is inserted into the socket, according to an embodiment.

FIG. 4B is a plan view illustrating the inside of a socket in a state in which a tray is inserted into the socket, according to an embodiment.

Referring to FIG. 4B, an electronic device (e.g., the electronic device 201 of FIG. 2A) according to an embodiment may include a housing (e.g., the housing 210 of FIG. 2C), a support member (e.g., the support member 220 of FIG. 2C), a display (e.g., the display 230 of FIG. 2C), a battery (e.g., the battery 240 of FIG. 2C), a PCB (e.g., the PCB 250 of FIG. 2C), the socket 410, the tray 420, the actuator 430, and a second intermediate structure 450.

Referring to FIG. 4B, a detailed description of a structure substantially the same as the structure described with reference to FIGS. 2A to 3F may be omitted.

In an embodiment, the tray 420 may include the tray body 421 (e.g., the tray body 321 of FIG. 3B), the tray head 422 (e.g., the tray head 322 of FIG. 3B) and the waterproof member 424 (e.g., the waterproof member 324 of FIG. 3B).

In an embodiment, the actuator 430 may generate power to remove the tray 420 from the socket 410. The actuator 430 may include the power source 431 (e.g., the power source 331 of FIG. 3B), the rod 432 (e.g., the rod 332 of FIG. 3B) and the block 433 (e.g., the block 333 of FIG. 3B). The block 433 may be formed to have a second inclined surface 4331 (e.g., the second inclined surface 3331 of FIG. 3B).

In an embodiment, in a state in which the tray 420 is inserted into the socket 410, the second intermediate structure 450 may be positioned adjacent to an inner end (e.g., a +y direction end) of the tray 420 in a longitudinal direction (e.g., a y direction). In a state in which the tray 420 is inserted into the socket 410, the actuator 430 may press the second intermediate structure 450 in a width direction (e.g., an x direction) of the tray 420 so that the second intermediate structure 450 removes the tray 420 from the socket 410.

In an embodiment, the second intermediate structure 450 may include a rail 451 and a slider 452.

In an embodiment, the rail 451 may be disposed along a longitudinal direction (e.g., a y direction) of the tray 420. For example, the rail 451 may be positioned on both sides of the socket 410 in a width direction (e.g., an x direction). The slider 452 may be movable along the rail 451. For example, both ends of the slider 452 in a width direction (e.g., an x direction) may be constrained to the rail 451 so as to slide along the rail 451. The slider 452 may be positioned to contact an inner end (e.g., a +y direction end) of the tray 420 in the longitudinal direction (e.g., the y direction). The slider 452 may have a third inclined surface 4521 contactable with the actuator 430. The third inclined surface 4521 may correspond to the second inclined surface 4331 of the block 433 of the actuator 430. For example, the third inclined surface 4521 may be formed in opposite inclined directions so as to be in surface contact with the second inclined surface 4331. An inclination angle of the third inclined surface 4521 may correspond to an inclination angle of the second inclined surface 4331. When the tray 420 and the actuator 430 are viewed from the side, at least a portion of the slider 452 and the block 433 may overlap with each other.

In an embodiment, when an operation command is input into the actuator 430 in a state in which the tray 420 is inserted into the socket 410, the actuator 430 may press the slider 452 in the width direction (e.g., the x direction) of the tray 420. The pressing force of the tray 420 transmitted to the slider 452 by the actuator 430 in the width direction (e.g., the x direction) of the tray 420 may be converted into a pressing force in the longitudinal direction (e.g., the y direction) of the tray 420 by the inclination angles of the second inclined surface 4331 and the third inclined surface 4521. Accordingly, the slider 452 may slide along the rail 451 in the longitudinal direction (e.g., the y direction) of the tray 420. As the slider 452 slides in a −y direction by the pressing force of the actuator 430, the tray 420 may be pushed in the direction (e.g., the −y direction) to remove the tray 420. Thus, the tray 420 may be removed from the socket 410. By the above-described structure, since the tray 420 indirectly receives a force of the actuator 430 at the inner end (e.g., the +y direction end) of the tray 420 formed in a linear shape, a possibility of the tray 420 being damaged due to stress concentration may be reduced. Since both ends of the slider 452 in the width direction (e.g., the x direction) are constrained to the rail 451, a possibility of the tray 420 being tilted in the width direction (e.g., the x direction) while the tray 420 is being removed may be reduced. When the removed tray 420 is reinserted into the socket 410, the slider 452 may be returned to its original position by contacting the inner end (e.g., the +y direction end) of the tray 420.

Figure 4C:
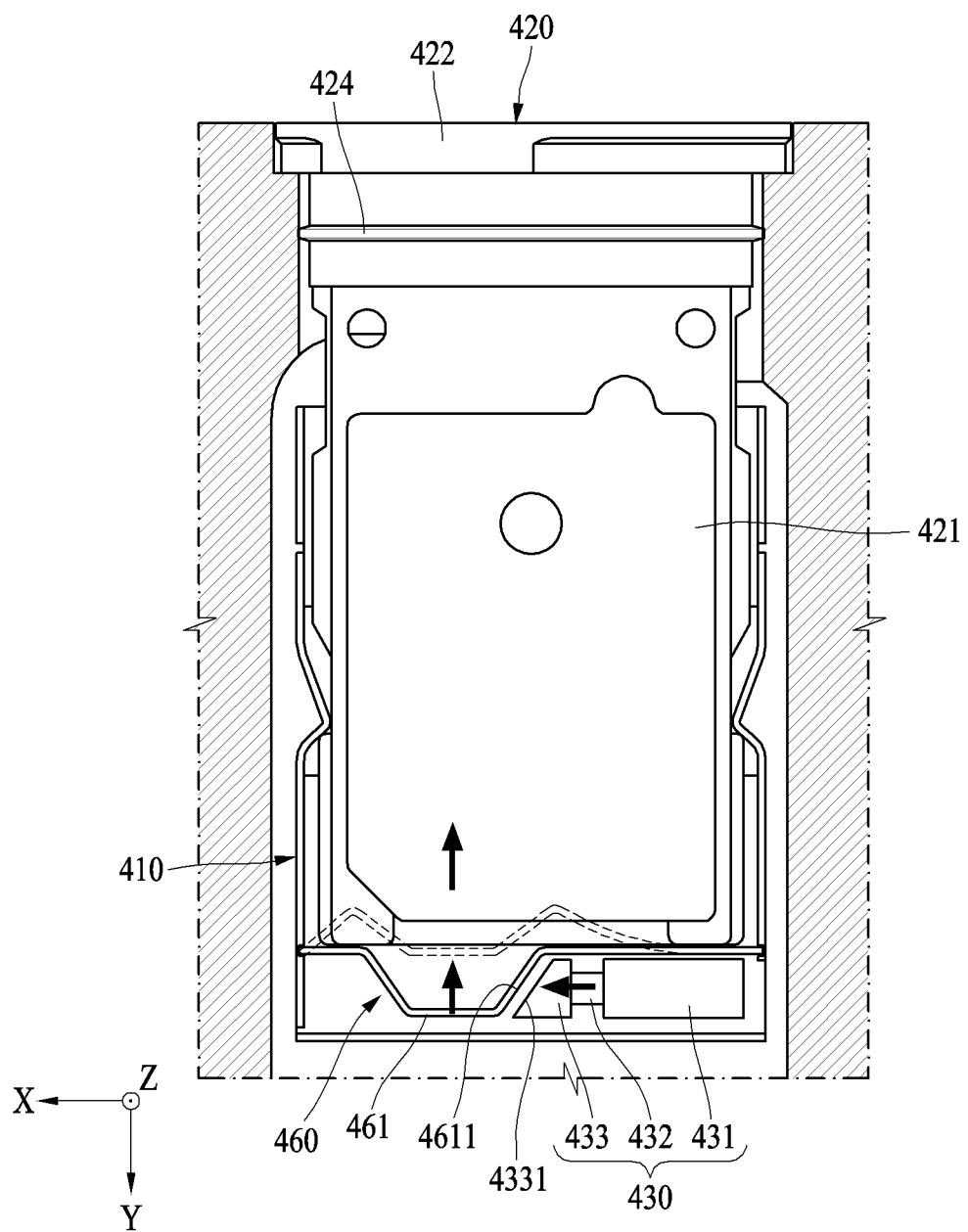
FIG. 4C is a plan view illustrating the inside of a socket in a state in which a tray is inserted into the socket, according to an embodiment.

FIG. 4C is a plan view illustrating the inside of a socket in a state in which a tray is inserted into the socket, according to an embodiment.

Referring to FIG. 4C, an electronic device (e.g., the electronic device 201 of FIG. 2A) according to an embodiment may include a housing (e.g., the housing 210 of FIG. 2C), a support member (e.g., the support member 220 of FIG. 2C), a display (e.g., the display 230 of FIG. 2C), a battery (e.g., the battery 240 of FIG. 2C), a PCB (e.g., the PCB 250 of FIG. 2C), the socket 410, the tray 420, the actuator 430, and a third intermediate structure 460.

Referring to FIG. 4C, a detailed description of a structure substantially the same as the structure described with reference to FIGS. 2A to 3F may be omitted.

In an embodiment, the tray 420 may include the tray body 421 (e.g., the tray body 321 of FIG. 3B), the tray head 422 (e.g., the tray head 322 of FIG. 3B), and the waterproof member 424 (e.g., the waterproof member 324 of FIG. 3B).

In an embodiment, the actuator 430 may generate power to remove the tray 420 from the socket 410. The actuator 430 may include the power source 431 (e.g., the power source 331 of FIG. 3B), the rod 432 (e.g., the rod 332 of FIG. 3B), and the block 433 (e.g., the block 333 of FIG. 3B). The block 433 may be formed to have the second inclined surface 4331 (e.g., the second inclined surface 3331 of FIG. 3B).

In an embodiment, in a state in which the tray 420 is inserted into the socket 410, the third intermediate structure 460 may be positioned adjacent to an inner end (e.g., a +y direction end) of the tray 420 in the longitudinal direction (e.g., the y direction). In a state in which the tray 420 is inserted into the socket 410, the actuator 430 may press the third intermediate structure 460 in the width direction (e.g., the x direction) of the tray 420 so that the third intermediate structure 460 removes the tray 420 from the socket 410.

In an embodiment, the third intermediate structure 460 may be formed in the width direction (e.g., the x direction) of the tray 420. For example, both ends of the third intermediate structure 460 in the width direction (e.g., the x direction) may be respectively connected to an inner end of the socket 410 in the width direction (e.g., the x direction). The third intermediate structure 460 may be formed of an elastically deformable material. The third intermediate structure 460 may include a bent portion 461. The bent portion 461 may be formed by (inclinedly) bending at least a portion of the third intermediate structure 460. The bent portion 461 may contact the actuator 430. For example, the bent portion 461 may have a fourth inclined surface 4611 contactable with the actuator 430. The fourth inclined surface 4611 may correspond to the second inclined surface 4331 of the block 433 of the actuator 430. For example, the fourth inclined surface 4611 may be formed in opposite inclined directions so as to be in surface contact with the second inclined surface 4331. An inclination angle of the fourth inclined surface 4611 may correspond to an inclination angle of the second inclined surface 4331. When the tray 420 and the actuator 430 are viewed from the side, at least a portion of the bent portion 461 and the block 433 may overlap with each other.

In an embodiment, when an operation command is input into the actuator 430 in a state in which the tray 420 is inserted into the socket 410, the actuator 430 may press the bent portion 461 in the width direction (e.g., the x direction) of the tray 420. As the bent portion 461 is pressed in the width direction (e.g., the x direction), the third intermediate structure 460 may be elastically deformed. For example, since both ends of the third intermediate structure 460 in the width direction (e.g., the x direction) are fixed to the socket 410, the third intermediate structure 460 may be elastically deformed in the longitudinal direction (e.g., the x direction) of the tray 420. As the third intermediate structure 460 is elastically deformed in the −y direction by the pressing force of the actuator 430, the tray 420 may be pushed in the direction (e.g., the −y direction) to remove the tray 420, and as a result, the tray 420 may be removed from the socket 410. By the above-described structure, since the tray 420 indirectly receives a force of the actuator 430 at the inner end (e.g., the +y direction end) of the tray 420 formed in a linear shape, a possibility of the tray 420 being damaged due to stress concentration may be reduced. When the tray 420 is removed from the socket 410, the third intermediate structure 460 may return to its original state by its own elastic force.

In an embodiment, the electronic device 201 includes the housing 210 forming the exterior of the electronic device 201 and having the opening 214 formed on one side thereof, the sockets 310 and 310' disposed in the housing 210 to be aligned with the opening 214, the tray 320 insertable into or removable from the sockets 310 and 310' through the opening 214, and the actuator 330 generating power to remove the tray 320 from the sockets 310 and 310'. The tray 320 may include a tray body 321 having a space 3211 for accommodating an external component and having a longitudinal direction in a direction inserted into the sockets 310 and 310', a tray head 322 formed at one end in a longitudinal direction of the tray body 321, and a protrusion 323 formed at another end of the tray body 321 in the longitudinal direction and having a first inclined surface 3231 formed on one side. In a state in which the tray 320 is inserted into the sockets 310 and 310', the actuator 330 may press the first inclined surface 3231 in the width direction of the tray 320 and may remove the tray 320 from the sockets 310 and 310' in the longitudinal direction of the tray 320.

In an embodiment, the actuator 330 may be disposed in the inner space of the sockets 310 and 310'.

In an embodiment, in a state in which the tray 320 is inserted into the sockets 310 and 310', the actuator 330 may be disposed in a space between another end of the tray body 321 in the longitudinal direction and the sockets 310 and 310'.

In an embodiment, the actuator 330 may generate power in a linear direction parallel to the width direction of the tray 320.

In an embodiment, the actuator 330 may include the power source 331 generating power in a linear direction parallel to the width direction of the tray 320, the rod 332 connected to the power source 331 so as to be parallel to the width direction of the tray 320, and the block 333 connected to an end of the rod 332 and having the second inclined surface 3331 corresponding to the first inclined surface 3231.

In an embodiment, the actuator 330 may further include a guide rail parallel to the width direction of the tray 320 to guide the moving path of the block 333.

In an embodiment, the socket 310' may include the elastic deformable portion 313 formed to be elastically deformable at a position adjacent to the actuator 330.

In an embodiment, the first inclined surface 3231 may be inclined at an angle of 30 degrees to 60 degrees with respect to the width direction of the tray 320.

In an embodiment, the length in which the protrusion 323 protrudes in the longitudinal direction of the tray body 321 from another end of the tray body 321 in the longitudinal direction may be 1 mm to 2 mm.

In an embodiment, the external component accommodated in the tray 320 may be at least one of an external memory card, a subscriber identification module card, or a user identity module card.

In an embodiment, the actuator 330 may press the first inclined surface 3231 in the width direction of the tray 320 and return to its original state after a designated time elapses.

In an embodiment, when it is confirmed that the tray 320 has been removed after the actuator 330 presses the first inclined surface 3231 in the width direction of the tray 320, the actuator 330 may return to its original state.

In an embodiment, the tray 320 may further include the waterproof member 324 connected to the tray body 321 so as to be adjacent to the tray head 322.

In an embodiment, an operation command of the actuator 330 may be input through a button displayed on the display 230 of the electronic device 201.

In an embodiment, the actuator 330 may operate after the user authentication procedure is completed.

In an embodiment, the electronic device 201 includes the housing 210 forming the exterior of the electronic device 201 and having the opening 214 formed on one side thereof, a socket 410 disposed in the housing 210 to be aligned with the opening 214, a tray 420 insertable into or removable from the socket 410 through the opening 214, intermediate structures (the first intermediate structure 440, the second intermediate structure 450, and the third intermediate structure 460) positioned adjacent to an end of the tray 420 in a state in which the tray 420 is inserted into the socket 410, and an actuator 430 generating power to remove the tray 420 from the socket 410. In a state in which the tray 420 is inserted into the socket 410, the actuator 430 may press the intermediate structures (the first intermediate structure 440, the second intermediate structure 450, and the third intermediate structure 460) in a width direction of the tray 420 so that the intermediate structures (the first intermediate structure 440, the second intermediate structure 450, and the third intermediate structure 460) remove the tray 420 from the socket 410.

In an embodiment, the first intermediate structure 440 may include the reference axis 441 positioned adjacent to an end of the tray 420 in a state in which the tray 420 is inserted into the socket 410 and the rotating member 442 rotatably connected to the reference axis 441 and having an end contacting the end of the tray 420.

In an embodiment, the second intermediate structure 450 may include the rail 451 disposed along the longitudinal direction of the tray 420 and the slider 452 movable along the rail 451 and having the third inclined surface 4521 contactable with the actuator 430.

In an embodiment, the third intermediate structure 460 may be formed to be elastically deformable, and at least a portion thereof may be inclinedly bent so as to contact the actuator 430.

In an embodiment, the electronic device 201 includes the housing 210 forming the exterior of the electronic device 201 and having the opening 214 formed on one side thereof, the sockets 310 and 310' disposed in the housing 210 to be aligned with the opening 214, the tray 320 insertable into or removable from the sockets 310 and 310' through the opening 214, and the actuator 330 generating power to remove the tray 320 from the sockets 310 and 310'. The tray 320 may include the tray body 321 having the space 3211 for accommodating an external component and having a longitudinal direction in a direction inserted into the sockets 310 and 310', the tray head 322 formed at one end in the longitudinal direction of the tray body 321, and the protrusion 323 formed at another end of the tray body 321 in the longitudinal direction and having the first inclined surface 3231 formed on one side. The actuator 330 may include a power source 331 generating power in a linear direction parallel to the width direction of the tray 320, a rod 332 connected to the power source 331 so as to be parallel to the width direction of the tray 320, and a block 333 connected to an end of the rod 332 and having a second inclined surface 3331 corresponding to the first inclined surface 3231. In a state in which the tray 320 is inserted into the sockets 310 and 310', the actuator 330 may be disposed in a space between another end of the tray body 321 in the longitudinal direction and the sockets 310 and 310'. In a state in which the tray 320 is inserted into the sockets 310 and 310', the actuator 330 may press the first inclined surface 3231 in the width direction of the tray 320 and may remove the tray 320 from the sockets 310 and 310' in the longitudinal direction of the tray 320. The first inclined surface 3231 may be inclined at an angle of 30 degrees to 60 degrees with respect to the width direction of the tray 320.

In an embodiment, the electronic device may comprise a housing comprising an opening and sockets aligned with the opening; a tray configured to be insertable into the sockets or removable from the sockets through the opening; and an actuator configured to generate power to remove the tray from the sockets. The tray may comprise a tray body comprising a space for inserting an external component into the sockets in a longitudinal direction; a tray head provided at one end of the tray body in the longitudinal direction; and a protrusion provided at another end of the tray body in the longitudinal direction and comprising a first inclined surface provided on one side of the protrusion. In a state in which the tray is inserted into the sockets, the actuator may be configured to press the first inclined surface in a width direction of the tray and be configured to remove the tray from the sockets in the longitudinal direction of the tray.

In an embodiment, the actuator may be configured to be disposed in an inner space of the sockets.

In an embodiment, in a state in which the tray is inserted into the sockets, the actuator may be configured to be disposed in a space between another end of the tray body in the longitudinal direction and the sockets.

In an embodiment, the actuator may be configured to generate power in a linear direction parallel to the width direction of the tray.

In an embodiment, the actuator may comprise a power source configured to generate power in a linear direction parallel to the width direction of the tray; a rod configured to be connected to the power source and configured to be parallel to the width direction of the tray; and a block configured to be connected to an end of the rod and comprising a second inclined surface corresponding to the first inclined surface.

In an embodiment, the actuator may further comprise a guide rail parallel to the width direction of the tray and configured to guide a moving path of the block.

In an embodiment, the socket may comprise an elastic deformable portion that is elastically deformable at a position adjacent to the actuator.

In an embodiment, the first inclined surface may be configured to be inclined at an angle of 30 degrees to 60 degrees with respect to the width direction of the tray.

In an embodiment, a length in which the protrusion protrudes in the longitudinal direction of the tray body from another end of the tray body in the longitudinal direction may be one (1) mm to two (2) mm.

In an embodiment, the external component accommodated in the tray may be at least one of an external memory card, a subscriber identification module card, or a user identity module card.

In an embodiment, the actuator may be configured to press the first inclined surface in the width direction of the tray and is configured to return to its original state after a designated time elapses.

In an embodiment, after the actuator presses the first inclined surface in the width direction of the tray, the actuator may be configured to return to its original state.

In an embodiment, wherein the tray may further comprise a waterproof member connected to the tray body, the waterproof member being adjacent to the tray head.

In an embodiment, wherein an operation command of the actuator may be input through a display of the electronic device.

In an embodiment, wherein the actuator may be configured to operate after a user authentication procedure is completed.

In an embodiment, the electronic device may comprise a housing comprising an opening and a socket aligned with the opening; a tray configured to be insertable into the socket or removable from the socket through the opening; intermediate structures provided adjacent to an end of the tray in a state in which the tray is inserted into the socket; and an actuator configured to generating power to remove the tray from the socket. In the state in which the tray is inserted into the socket, the actuator may be configured to press the intermediate structures in a width direction of the tray and to remove the tray from the socket.

In an embodiment, the intermediate structures may comprise a reference axis provided adjacent to an end of the tray in a state in which the tray is inserted into the socket; and a rotating member rotatably connected to the reference axis and comprising an end contacting the end of the tray.

In an embodiment, the intermediate structures may comprise a rail provided along a longitudinal direction of the tray; and a slider configured to be movable along the rail and comprising a third inclined surface being contactable with the actuator.

In an embodiment, the intermediate structures may be elastically deformable, and at least a portion of the intermediate structures is inclinedly bent and contacted with the actuator.

In an embodiment, the electronic device may comprise a housing comprising an opening and sockets aligned with the opening; a tray configured to insertable into the sockets or removable from the sockets through the opening; and an actuator configured to generate power to remove the tray from the sockets. The tray may comprise a tray body comprising a space for inserting an external component into the sockets in a longitudinal direction; a tray head provided at one end of the tray body in the longitudinal direction; and a protrusion provided at another end of the tray body in the longitudinal direction, the protrusion comprising a first inclined surface formed on one side of the protrusion. The actuator may comprise a power source configured to generate power in a linear direction parallel to a width direction of the tray; a rod connected to the power source, the rod being parallel to the width direction of the tray; and a block connected to an end of the rod and comprising a second inclined surface corresponding to the first inclined surface, and in a state in which the tray is inserted into the sockets, the actuator may be provided in a space between another end of the tray body in the longitudinal direction and the sockets, and in a state in which the tray is inserted into the sockets, the actuator may be configured to press the first inclined surface in a width direction of the tray and be configured to remove the tray from the sockets in the longitudinal direction of the tray, and the first inclined surface is configured to be inclined at an angle of 30 degrees to 60 degrees with respect to the width direction of the tray.

The effects of the electronic device according to an embodiment are not limited to the above-mentioned effects, and other unmentioned effects can be clearly understood from the following description by one of ordinary skill in the art.

What is claimed is:

1. An electronic device comprising:
   a housing comprising an opening and sockets aligned with the opening;
   a tray configured to be insertable into the sockets or removable from the sockets through the opening; and
   an actuator configured to generate power to remove the tray from the sockets,
   wherein the tray comprises:
      a tray body comprising a space for inserting an external component into the sockets in a longitudinal direction;
      a tray head provided at one end of the tray body in the longitudinal direction; and
      a protrusion provided at another end of the tray body in the longitudinal direction and comprising a first inclined surface provided on one side of the protrusion, and
   wherein, in a state in which the tray is inserted into the sockets, the actuator is configured to press the first inclined surface in a width direction of the tray and is configured to remove the tray from the sockets in the longitudinal direction of the tray.

2. The electronic device of claim 1, wherein the actuator is configured to be disposed in an inner space of the sockets.

3. The electronic device of claim 2, wherein in a state in which the tray is inserted into the sockets, the actuator is configured to be disposed in a space between another end of the tray body in the longitudinal direction and the sockets.

4. The electronic device of claim 1, wherein the actuator is configured to generate power in a linear direction parallel to the width direction of the tray.

5. The electronic device of claim 1, wherein the actuator comprises:
   a power source configured to generate power in a linear direction parallel to the width direction of the tray;
   a rod configured to be connected to the power source and configured to be parallel to the width direction of the tray; and a block configured to be connected to an end of the rod and comprising a second inclined surface corresponding to the first inclined surface.

6. The electronic device of claim 5, wherein the actuator further comprises a guide rail parallel to the width direction of the tray and configured to guide a moving path of the block.

7. The electronic device of claim 3, wherein the socket comprises an elastic deformable portion that is elastically deformable at a position adjacent to the actuator.

8. The electronic device of claim 1, wherein the first inclined surface is configured to be inclined at an angle of 30 degrees to 60 degrees with respect to the width direction of the tray.

9. The electronic device of claim 1, wherein a length in which the protrusion protrudes in the longitudinal direction of the tray body from another end of the tray body in the longitudinal direction is one (1) mm to two (2) mm.

10. The electronic device of claim 1, wherein the external component accommodated in the tray is at least one of an external memory card, a subscriber identification module card, or a user identity module card.

11. The electronic device of claim 1, wherein the actuator is configured to press the first inclined surface in the width direction of the tray and is configured to return to its original state after a designated time elapses.

12. The electronic device of claim 1, wherein, after the actuator presses the first inclined surface in the width direction of the tray, the actuator is configured to return to its original state.

13. The electronic device of claim 1, wherein the tray further comprises a waterproof member connected to the tray body, the waterproof member being adjacent to the tray head.

14. The electronic device of claim 1, wherein an operation command of the actuator is input through a display of the electronic device.

15. The electronic device of claim 14, wherein the actuator is configured to operate after a user authentication procedure is completed.

16. An electronic device comprising:
a housing comprising an opening and a socket aligned with the opening;
a tray configured to be insertable into the socket or removable from the socket through the opening;
intermediate structures provided adjacent to an end of the tray in a state in which the tray is inserted into the socket; and
an actuator configured to generating power to remove the tray from the socket,
wherein, in the state in which the tray is inserted into the socket, the actuator is configured to press the intermediate structures in a width direction of the tray and to remove the tray from the socket.

17. The electronic device of claim 16, wherein the intermediate structures comprise:
a reference axis provided adjacent to an end of the tray in a state in which the tray is inserted into the socket; and
a rotating member rotatably connected to the reference axis and comprising an end contacting the end of the tray.

18. The electronic device of claim 16, wherein the intermediate structures comprises:
a rail provided along a longitudinal direction of the tray; and
a slider configured to be movable along the rail and comprising a third inclined surface being contactable with the actuator.

19. The electronic device of claim 16, wherein the intermediate structures are elastically deformable, and at least a portion of the intermediate structures is inclinedly bent and contacted with the actuator.

20. An electronic device comprising:
a housing comprising an opening and sockets aligned with the opening;
a tray configured to insertable into the sockets or removable from the sockets through the opening; and
an actuator configured to generate power to remove the tray from the sockets,
wherein the tray comprises:
a tray body comprising a space for inserting an external component into the sockets in a longitudinal direction;
a tray head provided at one end of the tray body in the longitudinal direction; and
a protrusion provided at another end of the tray body in the longitudinal direction, the protrusion comprising a first inclined surface formed on one side of the protrusion, and
wherein the actuator comprises:
a power source configured to generate power in a linear direction parallel to a width direction of the tray;
a rod connected to the power source, the rod being parallel to the width direction of the tray; and
a block connected to an end of the rod and comprising a second inclined surface corresponding to the first inclined surface, and
in a state in which the tray is inserted into the sockets, the actuator is provided in a space between another end of the tray body in the longitudinal direction and the sockets, and
in a state in which the tray is inserted into the sockets, the actuator is configured to press the first inclined surface in a width direction of the tray and is configured to remove the tray from the sockets in the longitudinal direction of the tray, and
the first inclined surface is configured to be inclined at an angle of 30 degrees to 60 degrees with respect to the width direction of the tray.

\* \* \* \* \*